United States Patent
DeCesare et al.

(10) Patent No.: US 10,240,694 B2
(45) Date of Patent: Mar. 26, 2019

(54) CO-MOLDED SEALING RING FOR USE IN AN ELECTRICAL FITTING, AND A RAINTIGHT COMPRESSION CONNECTOR AND RAINTIGHT COMPRESSION COUPLER INCORPORATING A CO-MOLDED SEALING RING

(71) Applicant: Bridgeport Fittings, Inc., Stratford, CT (US)

(72) Inventors: Christopher W. DeCesare, Naugatuck, CT (US); Lawrence J. Smith, Stamford, CT (US)

(73) Assignee: BRIDGEPORT FITTINGS, INC., Stratford, CT (US)

( * ) Notice: Subject to any disclaimer, the term of this patent is extended or adjusted under 35 U.S.C. 154(b) by 309 days.

(21) Appl. No.: 15/291,696

(22) Filed: Oct. 12, 2016

(65) Prior Publication Data

US 2017/0030489 A1      Feb. 2, 2017

Related U.S. Application Data

(63) Continuation-in-part of application No. 15/079,148, filed on Mar. 24, 2016, now Pat. No. 9,787,070, and
(Continued)

(51) Int. Cl.
*F16L 5/08*      (2006.01)
*F16J 15/02*     (2006.01)
(Continued)

(52) U.S. Cl.
CPC .............. *F16L 5/08* (2013.01); *F16J 15/022* (2013.01); *F16L 21/04* (2013.01); *H02G 3/0616* (2013.01)

(58) Field of Classification Search
CPC .............................. F16J 15/3496; F16L 21/04
(Continued)

(56) References Cited

U.S. PATENT DOCUMENTS

| 1,186,812 A | 6/1916 | McFerran |
| 1,327,106 A | 1/1920 | Leahy |

(Continued)

FOREIGN PATENT DOCUMENTS

| CN | 102011904 A | 4/2011 | |
| EP | 0188300 A1 * | 7/1986 | ....... B29C 45/14311 |

*Primary Examiner* — David Bochna
(74) *Attorney, Agent, or Firm* — Ware, Fressola, Maguire & Barber LLP

(57) ABSTRACT

A co-molded sealing ring for use in an electrical fitting has an uncompressed state and a compressed state and includes a first segment formed from thermoplastic elastomer and a second segment co-molded to the first segment, formed from a medium-density polyethylene material. A space formed between the first segment and an inner surface of an electrical fitting connector body when the ring is in the uncompressed state, is at least partially filled by a portion of the first segment when the ring is in the compressed state; the second segment having an end surface positioned away from the first segment, the end surface dimensioned for contact by a gland ring so as to urge the sealing ring into the compressed state so that the first segment forms a seal between the inner surface of the connector body and an outer surface of a conduit positioned within the connector body.

26 Claims, 20 Drawing Sheets

Related U.S. Application Data a continuation-in-part of application No. 14/068,663, filed on Oct. 31, 2013, now Pat. No. 9,343,883.

(60) Provisional application No. 62/142,150, filed on Apr. 2, 2015.

(51) Int. Cl.
*F16L 21/04* (2006.01)
*H02G 3/06* (2006.01)

(58) Field of Classification Search
USPC .................. 277/596, 641, 650, 651, 654
See application file for complete search history.

(56) References Cited

U.S. PATENT DOCUMENTS

| | | | |
|---|---|---|---|
| 1,488,175 A | 3/1924 | Strandell | |
| 1,772,536 A | 8/1930 | Cox | |
| 1,796,806 A | 3/1931 | Pearson | |
| 1,809,582 A | 6/1931 | Church | |
| 1,809,583 A | 6/1931 | Church | |
| 1,888,343 A | 11/1932 | Bohlman et al. | |
| 2,139,413 A | 10/1933 | Kreidel | |
| 2,100,796 A | 11/1937 | Church | |
| 2,114,771 A * | 4/1938 | Turner | F16L 19/075 |
| | | | 277/622 |
| 2,158,757 A | 5/1939 | Max | |
| 2,233,214 A | 2/1941 | Neil | |
| 2,255,673 A | 9/1941 | McDermott | |
| 2,448,888 A | 9/1948 | Hynes | |
| 2,474,319 A | 6/1949 | Jacques | |
| 2,503,169 A | 4/1950 | Phillips | |
| 2,651,529 A | 7/1951 | Wayman | |
| 2,761,705 A | 9/1956 | Kreidel | |
| 2,833,569 A | 5/1958 | Budnick | |
| 2,836,438 A | 5/1959 | Turnipseed | |
| 3,140,342 A * | 7/1964 | Avery | F16J 15/06 |
| | | | 174/356 |
| 3,144,153 A * | 8/1964 | Fuller | A47J 41/0011 |
| | | | 215/12.1 |
| 3,166,332 A * | 1/1965 | Olson | F16J 15/106 |
| | | | 220/378 |
| 3,275,347 A | 9/1966 | William | |
| 3,346,274 A * | 10/1967 | Baron | F16L 25/023 |
| | | | 285/334.3 |
| 3,393,931 A | 7/1968 | Wurzburger | |
| 3,647,934 A | 3/1972 | Hurtt | |
| 3,667,783 A | 6/1972 | Sotolongo | |
| 3,794,362 A | 2/1974 | Mooney | |
| 3,801,131 A | 4/1974 | Appleton | |
| 3,907,335 A | 9/1975 | Burge et al. | |
| 3,972,547 A | 8/1976 | Itoya | |
| 4,019,762 A | 4/1977 | Eidelberg et al. | |
| 4,030,741 A | 6/1977 | Fidrych | |
| 4,145,075 A | 3/1979 | Holzmann | |
| 4,250,348 A | 2/1981 | Kitagawa | |
| 4,376,873 A | 3/1983 | Lackinger | |
| 4,508,466 A | 4/1985 | Dennis | |
| 4,515,991 A | 5/1985 | Hutchison | |
| 4,547,623 A | 10/1985 | Van Brunt et al. | |
| 4,549,755 A | 10/1985 | Kot et al. | |
| 4,606,562 A | 8/1986 | Saraceno | |
| 4,608,454 A | 8/1986 | Lackinger | |
| 4,676,533 A | 6/1987 | Gerondale | |
| 4,877,270 A | 10/1989 | Phillips | |
| 4,915,427 A | 4/1990 | Zahuranec | |
| 4,983,784 A | 1/1991 | Whitlock | |
| 5,028,078 A | 7/1991 | Schwarz et al. | |
| 5,037,140 A | 8/1991 | Anderson | |
| 5,068,494 A | 11/1991 | Bolante | |
| 5,208,427 A | 5/1993 | Couto et al. | |
| 5,230,536 A | 7/1993 | Rider et al. | |
| 5,393,109 A | 2/1995 | Gumpel | |
| 5,466,890 A | 11/1995 | Stagnitti | |
| 5,621,191 A | 4/1997 | Norris et al. | |
| 5,951,327 A | 9/1999 | Marik | |
| 6,073,976 A | 6/2000 | Schmidt et al. | |
| 6,173,969 B1 * | 1/2001 | Stoll | F16J 15/061 |
| | | | 277/630 |
| 6,268,565 B1 | 7/2001 | Daoud | |
| 6,641,180 B2 | 11/2003 | Udhoefer | |
| 6,702,336 B1 | 3/2004 | Chelchowski et al. | |
| 6,835,088 B2 | 12/2004 | Shemtov | |
| 6,840,550 B2 | 1/2005 | Sundholm | |
| 6,851,728 B2 | 2/2005 | Minami | |
| 6,962,373 B2 * | 11/2005 | Houghton | F16L 21/03 |
| | | | 277/626 |
| 6,988,746 B2 | 1/2006 | Olson | |
| 7,002,077 B2 | 2/2006 | Pyron | |
| 7,080,859 B1 | 7/2006 | Gretz et al. | |
| 7,390,027 B2 | 6/2008 | Kiely | |
| 7,438,327 B2 | 10/2008 | Auray | |
| 7,762,559 B2 * | 7/2010 | Suzuki | F16J 15/104 |
| | | | 277/627 |
| 7,841,630 B1 | 11/2010 | Auray | |
| 7,976,070 B2 | 7/2011 | Kiely | |
| 8,129,633 B1 | 3/2012 | Shemtov | |
| 8,474,877 B2 | 7/2013 | Smith | |
| 8,814,174 B2 * | 8/2014 | Okuda | F16J 15/122 |
| | | | 277/628 |
| 2004/0090067 A1 | 5/2004 | Pridham | |
| 2005/0194785 A1 | 9/2005 | Shemtov | |
| 2005/0242571 A1 * | 11/2005 | Houghton | F16J 15/025 |
| | | | 285/110 |
| 2008/0143103 A1 | 6/2008 | Kiely | |

* cited by examiner

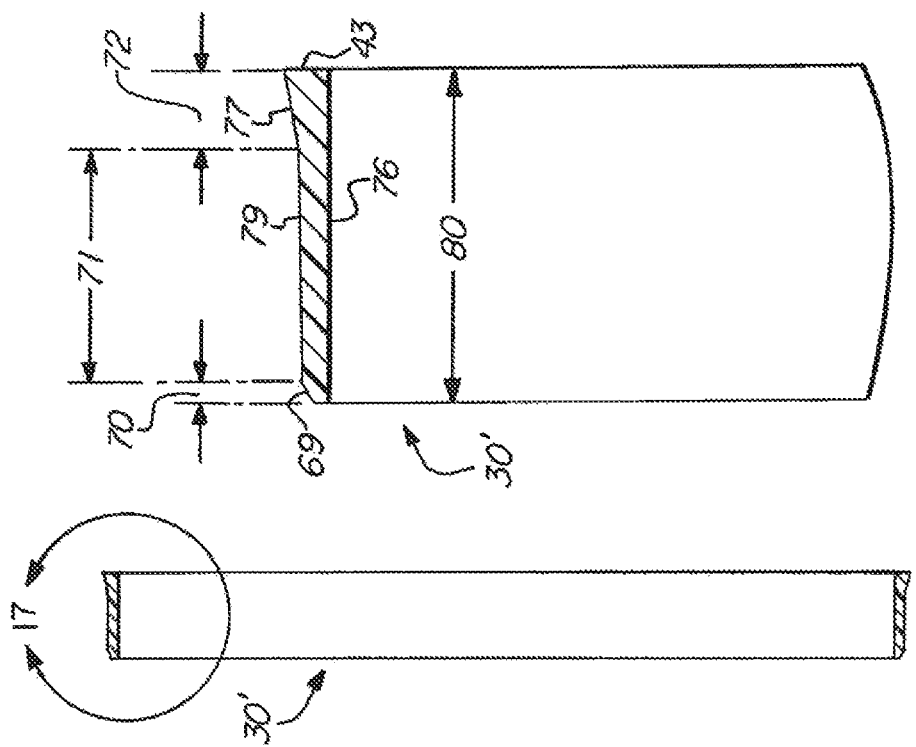
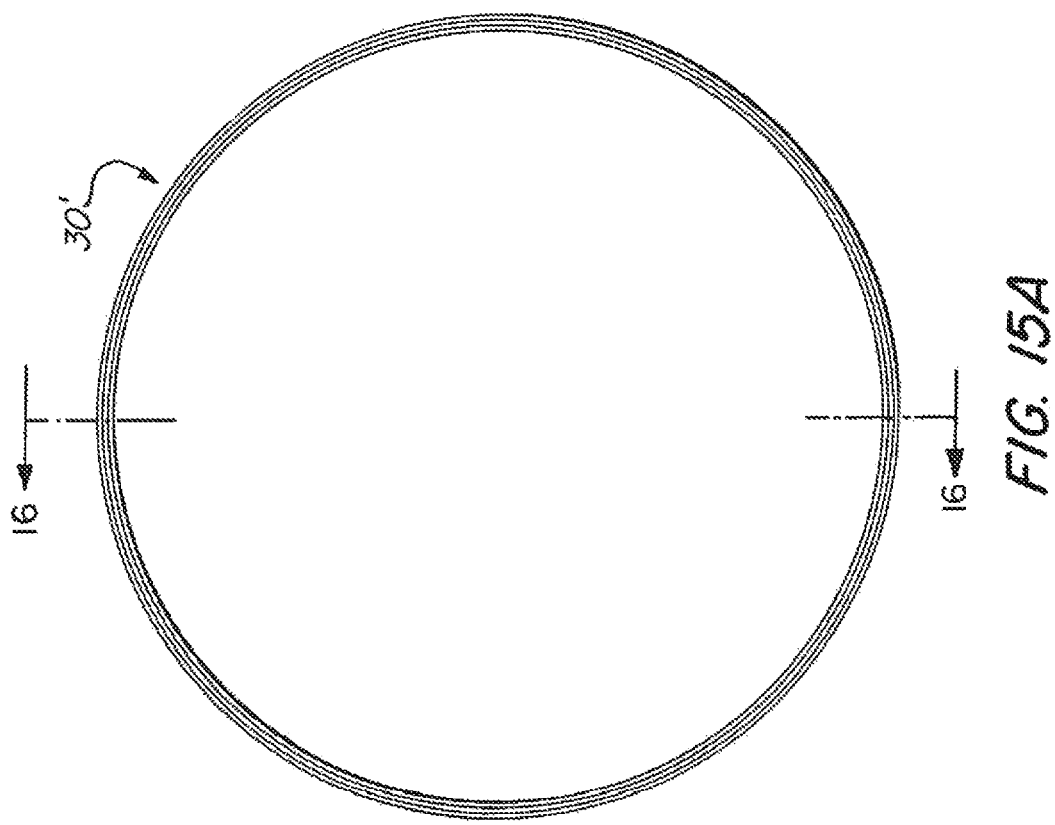

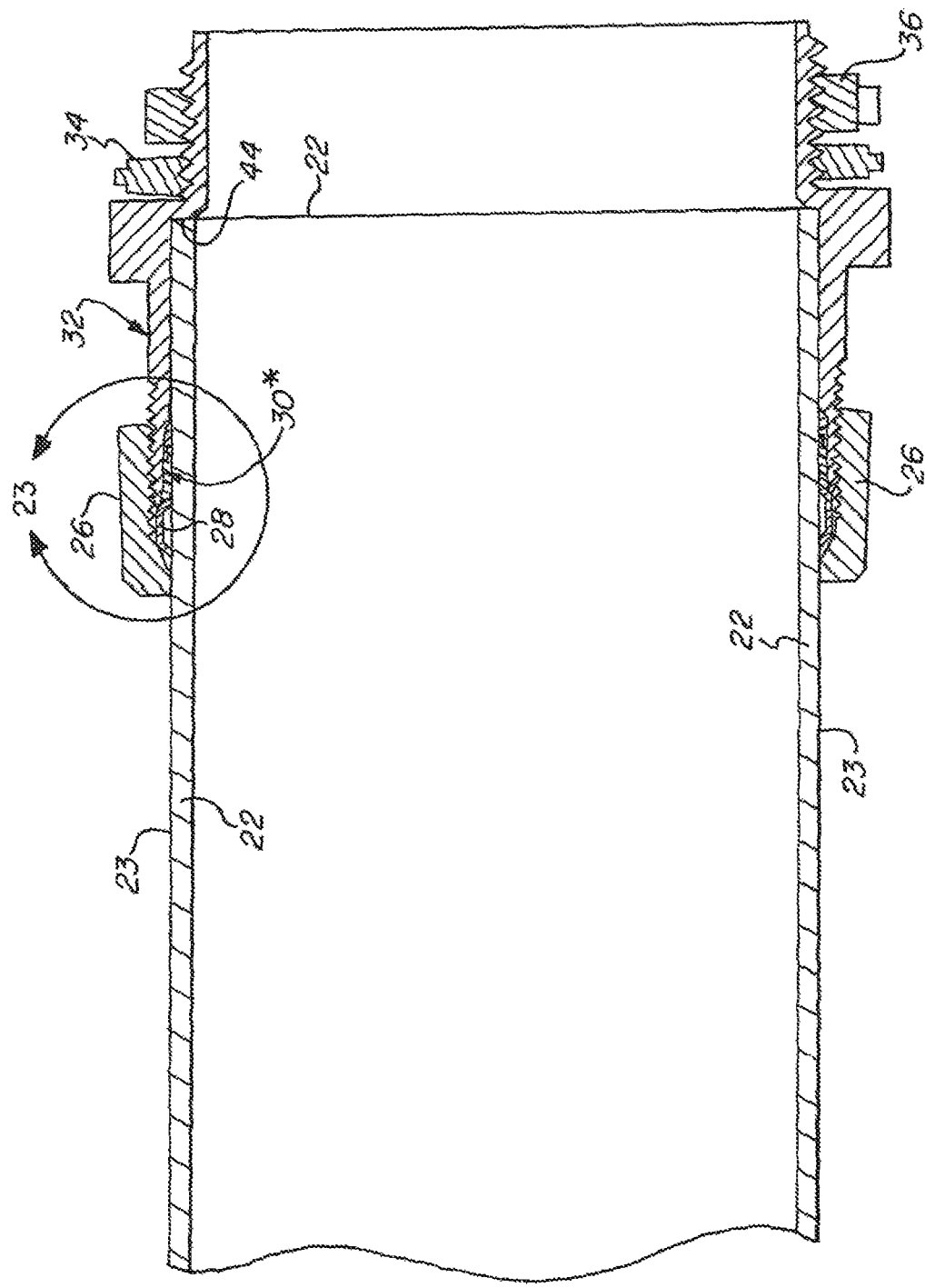

CO-MOLDED SEALING RING FOR USE IN AN ELECTRICAL FITTING, AND A RAINTIGHT COMPRESSION CONNECTOR AND RAINTIGHT COMPRESSION COUPLER INCORPORATING A CO-MOLDED SEALING RING

CROSS REFERENCE TO RELATED APPLICATIONS

This application claims priority to U.S. Utility patent application Ser. No. 15/079,148 now U.S. Pat. No. 9,787,070 filed on Mar. 24, 2016, which in turn claims priority to U.S. Utility patent application Ser. No. 14/068,663 now U.S. Pat. No. 9,343,883 filed on Oct. 31, 2013, which in turn claims priority to U.S. Provisional Patent Application No. 62/142,150 filed on Apr. 2, 2015. The contents of all of these applications are also hereby incorporated by reference in their entirety.

FIELD OF THE INVENTION

This invention is directed to a co-molded sealing ring for use in an electrical fitting, including a raintight compression connector for securing electrical metallic tubing (EMT), or rigid metallic conduit (RMC) to an electrical enclosure and to a raintight compression coupler for securing two EMT's or RMC's to each other. The invention is thus with respect to a co-molded sealing ring, taken alone or in combination with a raintight compression connector or a raintight compression coupler.

BACKGROUND OF THE INVENTION

Various types of raintight electrical connectors have been developed for securing electrical metallic tubing to an electrical enclosure, such as a junction box or the like. Corresponding raintight electrical couplers have also been developed for securing two EMT's or RMC's (sometimes collectively referred to herein as conduit) to each other. Existing connectors and couplers may use a sealing ring for preventing water intrusion between the outer surface of the EMT or RMC and an electrical enclosure or other EMT or RMC. It has been observed that existing connectors and couplers may have difficulty maintaining a raintight connection due to sealing surface imperfections of the EMT or RMC outside diameters, especially with larger diameter trade sizes. A co-molded sealing ring according to the present invention is able to achieve improved raintight capability for such electrical fittings without the need for an additional sealing ring and/or stop seal.

SUMMARY OF THE INVENTION

The present invention relates to co-molded sealing ring for use in an electrical fitting, the co-molded sealing ring having an uncompressed state and a compressed state, the co-molded sealing ring comprising a first segment formed from thermoplastic elastomer and a second segment co-molded to the first segment, formed from a medium-density polyethylene material attached at an end thereof to an end of the first segment, wherein a space formed between the first segment and an inner surface of a connector body of the electrical fitting when the co-molded sealing ring is in the uncompressed state, is at least partially filled by a portion of the first segment when the co-molded sealing ring is in the compressed state, wherein said second segment has an end surface positioned away from the first segment, said end surface of the second segment dimensioned for contact by a gland ring so as to urge the co-molded sealing ring into the compressed state so that said first segment forms a seal between the inner surface of the connector body and an outer surface of a conduit positioned within the connector body.

Another embodiment of the present invention is the co-molded sealing ring as described above, wherein the first segment of the co-molded sealing ring has a sloping surface dimensioned to contact a recess shoulder in a bore of the connector body.

Another embodiment of the present invention is the co-molded sealing ring as described above, wherein the second segment of the co-molded sealing ring has a sloping surface extending away from a lower surface of the second segment, said sloping surface dimensioned to contact a portion of the inner surface of the connector body.

A further embodiment of the present invention is the co-molded sealing ring as described above, wherein the first segment of the co-molded sealing ring has a circumferential rim at said end of said first segment and a circumferential notch near said end of the first segment and wherein the second segment of the co-molded sealing ring has a circumferential rim at said end of said second segment and a circumferential notch near said end of the second segment, said first segment circumferential rim interfitting with the circumferential notch of the second segment and the second segment circumferential rim interfitting with the circumferential notch of the first segment.

A further embodiment of the present invention is the co-molded sealing ring as described above, wherein a lower surface of the first segment is smooth and the lower surface of the second segment is smooth.

A still further embodiment of the present invention is the co-molded sealing ring as described above, wherein the electrical fitting is a raintight compression connector.

A further embodiment of the present invention is the co-molded sealing ring as described above, wherein the electrical fitting is a raintight compression coupler.

Another embodiment of the present invention is the co-molded sealing ring as described above, wherein the co-molded sealing ring has first, second and third regions, the second region formed between the first and third regions, the first region having a sloping surface dimensioned to contact a recess shoulder in a bore of the connector body and the third region having a sloping surface dimensioned to contact an inner surface of the connector body, wherein a first segment of the co-molded sealing ring, comprising the first region and a portion of the second region, is formed from a thermoplastic elastomer material so that a space formed between the first segment and a second portion of the lower surface of the connector body adjacent said recess shoulder when the co-molded sealing ring is in an uncompressed states is at least partially filled by the first segment when the co-molded sealing ring is in a compressed state, and wherein a second segment of the co-molded sealing ring, comprising a remainder of said second region and said third region, is formed from a medium-density polyethylene material, said second segment co-molded to the first segment, said second segment having an end surface positioned away from the first segment, said end surface dimensioned for contact by a gland ring so as to urge the co-molded sealing ring into the compressed state, and further wherein the first and second segments each have a lower surface dimensioned to contact an outer surface of a conduit positioned within said bore of the connector body; whereby a raintight seal is established between the electrical fitting and the conduit when the sealing ring is in the compressed state.

Another embodiment of the present invention is the co-molded sealing ring as described above, wherein the lower surface of the first segment is smooth and the lower surface of the second segment is smooth.

Another embodiment of the present invention is the co-molded sealing ring for use in an electrical fitting as described above, the co-molded sealing ring having a first region, a second region and a third region, the second region formed between the first and third regions, the region having a first sloping surface dimensioned to contact a recess shoulder in a bore of a connector body of said electrical fitting and the third region having a sloping surface dimensioned to contact an inner surface of the connector body, wherein a first segment of the co-molded sealing ring, comprising the first region and a portion of the second region, is formed from a thermoplastic elastomer material so that a space formed between the first segment and the inner surface of the connector body adjacent said recess shoulder when the co-molded sealing ring is in an uncompressed state, is at least partially filled by the first segment when the sealing ring is in a compressed state, and wherein a second segment of the co-molded sealing ring, comprising a remainder of said second region and said third region, is formed from a medium-density polyethylene material, said second segment co-molded to the first segment, said second segment having an end surface positioned away from the first segment, said end surface dimensioned for contact by a gland ring so as to urge the co-molded sealing ring into the compressed state, and further wherein the first and second segments each have a lower surface dimensioned to contact an outer surface of a conduit positioned within said bore of the connector body; whereby a raintight seal is established between the electrical fitting and the conduit when the sealing ring is in the compressed state.

Another embodiment of the present invention is the co-molded sealing ring as described above, wherein the first segment of the co-molded sealing ring has a circumferential rim at an end thereof positioned away from the first sloping surface and a circumferential notch near said end positioned away from the first sloping surface and wherein the second segment of the co-molded sealing ring has a circumferential rim at an end thereof positioned away from said end surface and a circumferential notch near said end positioned away from the surface, said first segment circumferential rim interfitting with the circumferential notch of the second segment and the second segment circumferential rim interfitting with the circumferential notch of the first segment.

A further embodiment of the present invention is the co-molded sealing ring as described above, wherein the lower surface of the first segment is smooth and the lower surface of the second segment is smooth.

A still further embodiment of the present invention is the co-molded sealing ring as described above, wherein the electrical fitting is a raintight compression connector.

Another embodiment of the present invention is the co-molded sealing ring as described above, wherein the electrical fitting is a raintight compression coupler.

Another embodiment of the present invention is the raintight compression connector, comprising a connector body having a first portion and a second portion and a bore extending through the first portion and the second portion, the first portion dimensioned for receipt of a conduit in said bore; a gland nut having internal threads dimensioned for threaded engagement with first external threads formed in the first portion at the first end; a gland ring dimensioned for contact with the gland nut so as to secure the gland nut and the first portion of the connector body to the conduit when the conduit is inserted into the first portion; a co-molded sealing ring dimensioned for contact with the first portion of the connector body so as to make sealing contact with the conduit when the conduit is inserted into the first portion, said co-molded sealing ring having first, second and third regions, the second region formed between the first and third regions, the first region having a first sloping surface dimensioned to contact a recess shoulder in the bore of the first portion of the connector body and the third region having a third sloping surface dimensioned to contact an inner surface of the first portion of the connector body, wherein a first segment of the co-molded sealing ring, comprising the first region and a portion of the second region, is formed from a thermoplastic elastomer material so that a space formed between the first segment and the inner surface of the connector body adjacent said recess shoulder when the co-molded sealing ring is in an uncompressed state, is at least partially filled by the first segment when the co-molded sealing ring is in a compressed state, and wherein a second segment of the co-molded sealing ring, comprising a remainder of said second region and said third region, is formed from a medium-density polyethylene material, said second segment having an end surface positioned away from the first segment, said end surface dimensioned for contact by a gland ring so as to urge the co-molded sealing ring into the compressed state, and further wherein the first and second segments each have a lower surface dimensioned to contact an outer surface of a conduit positioned within said bore of the connector body; whereby a raintight seal is established between the electrical fitting and the conduit when the sealing ring is in the compressed state, wherein the connector body has an outer flange and wherein the second portion of the connector body is dimensioned for receipt of a knockout gasket, the second portion having second external threads dimensioned for receipt of a locknut for securing the knockout gasket positioned around a knockout hole in an electrical enclosure between said outer flange and the electrical enclosure, thereby forming a raintight seal therewith.

Another embodiment of the present invention is the raintight compression connector as described above, wherein the slope of said third sloping surface is approximately ten degrees relative to the lower surface of the co-molded sealing ring.

A further embodiment of the present invention is the raintight compression connector as described above, wherein the slope of said first sloping surface is approximately thirty degrees relative to the lower surface of the co-molded sealing ring.

A further embodiment of the present invention is the raintight compression connector as described above, wherein the second region has a second sloping surface and wherein the slope of the second sloping surface is approximately two degrees relative to the lower surface of the co-molded sealing ring.

A still further embodiment of the present invention is the raintight compression connector as described above, wherein the co-molded sealing ring has an overall length and the third region of said co-molded sealing ring is approximately twenty-three percent of said overall length.

Another embodiment of the present invention is the raintight compression connector as described above, wherein the first region of said co-molded sealing ring is approximately six and one-half percent of said overall length of the co-molded sealing ring.

Another embodiment of the present invention is the raintight compression connector as described above, wherein the co-molded sealing ring has an uncompressed cross-sectional profile substantially as shown in FIG. 28.

Another embodiment of the present invention is the raintight compression coupler, comprising a connector body having a first portion and a second portion and a bore extending through the first portion and the second portion, the first portion dimensioned for receipt of a conduit in said bore, the first portion having a first end and a second end and the second portion dimensioned for receipt of a conduit in said bore, the second portion having a first end and a second end, a first gland nut having internal threads dimensioned for threaded engagement with first external threads formed in the first portion at its first end, a first gland ring dimensioned for contact with the first gland nut so as to secure the first gland nut and the first portion of the connector body to the first conduit when the first conduit is inserted into the first portion, a first co-molded sealing ring dimensioned for contact with the first portion of the connector body so as to make sealing contact with the first conduit when the first conduit is inserted into the first portion, said first co-molded sealing ring having a first, second and third region, the second region formed between the first and third regions, the first region having a sloping surface dimensioned to contact a recess shoulder in the bore of the first portion of the connector body and the third region having a sloping surface dimensioned to contact an inner surface of the first portion of the connector body, wherein a first segment of the co-molded sealing ring, comprising the first region and a portion of the second region, is formed from a thermoplastic elastomer material so that a space formed between the first segment and the inner surface of the connector body adjacent said recess shoulder when the co-molded sealing ring is in an uncompressed state, is substantially filled by the first segment when the co-molded sealing ring is in a compressed state, and wherein a second segment of the co-molded sealing ring, comprising a remainder of said second region and said third region, is formed from a medium-density polyethylene material, said second segment having an end surface positioned away from the first segment, said end surface dimensioned for contact by a gland ring so as to urge the co-molded sealing ring into the compressed state, and further wherein the first and second segments each have a lower surface dimensioned to contact an outer surface of a conduit positioned within said bore of the connector body, whereby a raintight seal is established between the electrical fitting and the conduit when the sealing ring is in the compressed state, and a second gland nut having internal threads dimensioned for threaded engagement with second external threads formed in the second portion at its first end, a second gland ring dimensioned for contact with the second gland nut so as to secure the second gland nut and the second portion of the connector body to the second conduit when the second conduit is inserted into the second portion, and a second co-molded sealing ring dimensioned for contact with the second portion of the connector body so as to make sealing contact with the second conduit when the second conduit is inserted into the second portion, said second co-molded sealing ring having a first, second and third region, the second region formed between the first and third regions, the first region having a sloping surface dimensioned to contact a recess shoulder in the bore of the first portion of the connector body and the third region having a sloping surface dimensioned to contact an inner surface of the second portion of the connector body wherein a first segment of the co-molded sealing ring, comprising the first region and a portion of the second region, is formed from a thermoplastic elastomer material so that a space formed between the first segment and the inner surface of the connector body adjacent said recess shoulder when the co-molded sealing ring is in an uncompressed state, is at least partially filled by the first segment when the co-molded sealing ring is in a compressed state, and wherein a second segment of the co-molded sealing ring, comprising a remainder of said second region and said third region, is formed from a medium-density polyethylene material, said second segment having an end surface positioned away from the first segment, said end surface dimensioned for contact by a gland ring so as to urge the co-molded sealing ring into the compressed state, and further wherein the first and second segments each have a lower surface dimensioned to contact an outer surface of a conduit positioned within said bore of the connector body, whereby a raintight seal is established between the electrical fitting and the conduit when the sealing ring is in the compressed state.

Another embodiment of the present invention is the raintight compression coupler as described above, wherein the slopes of said third sloping surface of the first co-molded sealing ring and the third sloping surface of the second co-molded sealing ring are approximately ten degrees relative to the lower surface of the first co-molded sealing ring and the lower surface of the second co-molded sealing ring respectively.

A further embodiment of the present invention is the raintight compression coupler as described above, wherein the slopes of the first sloping surface of the first co-molded sealing ring and the first sloping surface of the co-molded second sealing ring are approximately thirty degrees relative to the lower surface of the first co-molded sealing ring and a lower surface of the second co-molded sealing ring respectively.

A further embodiment of the present invention is the raintight compression coupler as described above, wherein the second region of the first co-molded sealing ring and the second region of the second co-molded sealing ring each has a second sloping surface and wherein the slopes of the second sloping surface of the first co-molded sealing ring and the second sloping surface of the second co-molded sealing ring are approximately two degrees relative to the lower surface of the first co-molded sealing ring and the lower surface of the second co-molded sealing ring respectively.

A still further embodiment of the present invention is the raintight compression coupler as described above, wherein the first co-molded sealing ring and the second co-molded sealing ring each has an overall length and the third region of said first and second co-molded sealing rings are each approximately twenty-three percent of said overall length.

A further embodiment of the present invention is the raintight compression coupler as described above, wherein the first region of said first co-molded sealing ring and said second co-molded sealing ring are each approximately six and one-half percent of said respective overall length of the first and second co-molded sealing rings.

Another embodiment of the present invention is the raintight compression coupler as described above, wherein the first co-molded sealing ring and the second co-molded sealing ring each has an uncompressed cross-sectional profile substantially as shown in FIG. 28.

BRIEF DESCRIPTION OF THE DRAWINGS

FIG. 15A is a top plan view of the upper sealing ring shown in FIG. 15.

FIG. 16 is a cross-sectional view of the upper sealing ring taken along line 16-16 of FIG. 15A.

FIG. 17 is an enlarged cross-sectional view of the profile of the upper sealing ring taken along circle 17 of FIG. 16.

FIG. 22 is a cross-sectional view of the electrical fitting shown in FIG. 21 taken along line 22-22 of FIG. 21.

DETAILED DESCRIPTION

The present invention, as shown in FIGS. 21-28, is an improvement to what is called an upper sealing ring 30' as discussed initially below with respect to FIGS. 1-20. This improvement is a co-molded sealing ring 30* and is described below following the discussion of FIGS. 1-20.

As discussed in applicant's co-pending U.S. application Ser. No. 15/079,148, the prior invention discussed therein is directed to an improved upper sealing ring 30' forming part of a raintight compression connector 20 or a raintight compression coupler 20' as discussed below.

Prior Improved Upper Sealing Ring (FIGS. 1-20)

Figure 1:
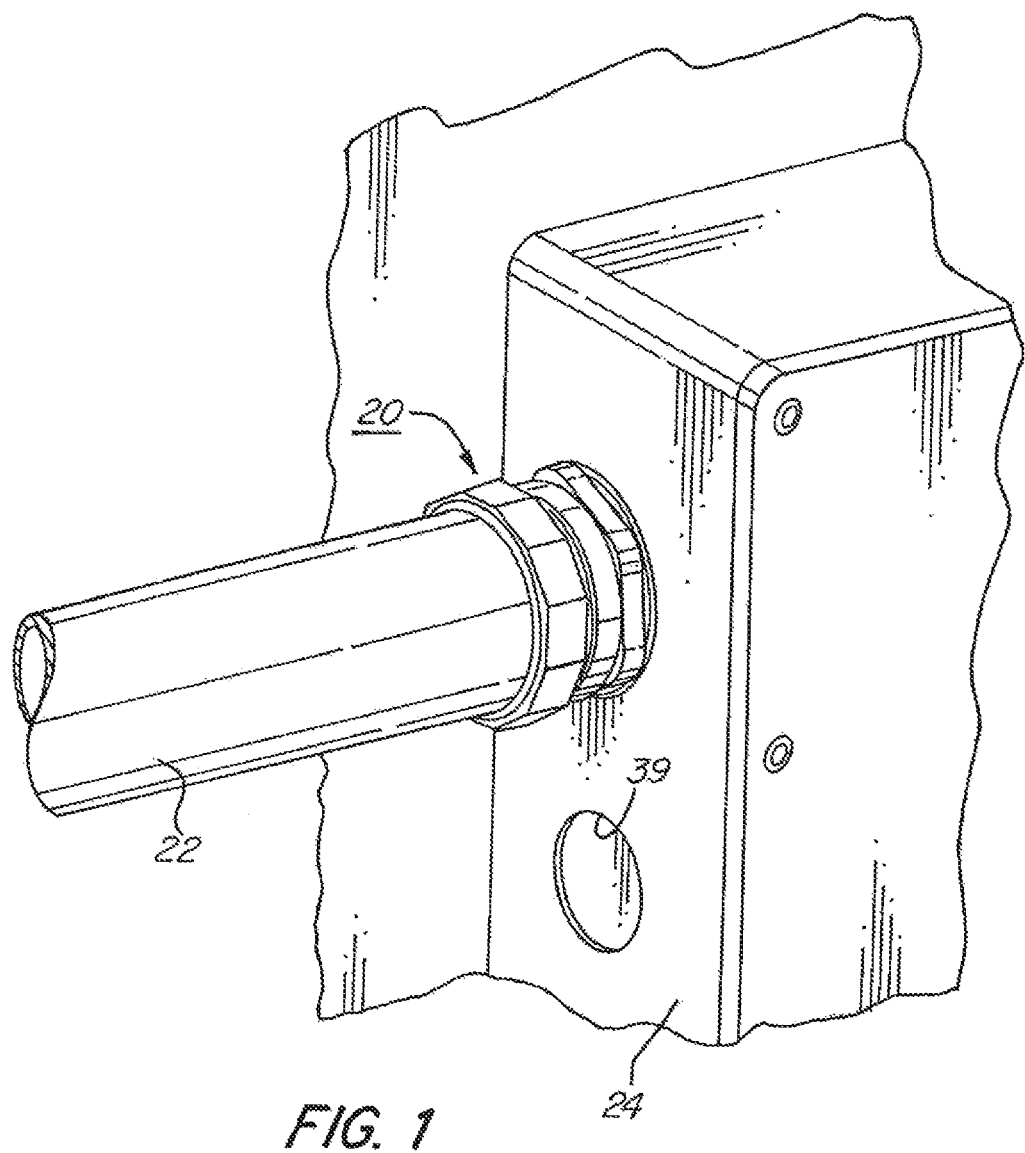
FIG. 1 is a perspective view of the raintight compression connector according to an embodiment of the present invention, the connector attached to an electrical enclosure.

As seen in FIG. 1, an embodiment of a raintight compression connector 20 according to the prior invention is configured for receipt of an electrical metallic tubing or rigid metallic conduit (EMT or RMC) 22 (collectively referred to as conduit) so as to form a raintight seal between the EMT or RMC and an electrical enclosure 24 to which the compression connector is attached through a knockout hole (see, for example, knockout hole 39). Such a raintight compression connector is typically used in applications where the electrical enclosure 24 is exposed to water, such as an outdoor environment where rain is present from time to time. It is known in the art that RMC is similar to EMC, but has a greater wall thickness and is therefore typically used in what are considered in the electrical contractor industry as heavy-duty applications.

FIGS. 1-6 show the components of the raintight compression connector. These components include a connector body 32 having a first portion 47 and a second portion 49 and a bore 33 extending through the first portion and the second portion. The raintight compression connector also includes a gland nut 26, a gland ring 28 (also referred to as a split compression ring), an upper sealing ring 30, as well as a knockout gasket 34, a locknut 36 and a conduit stop seal 38. The connector body, gland nut and locknut are typically fabricated from a die cast zinc alloy. Other materials and fabrication techniques could be used as known to those skilled in the art.

Figure 4:
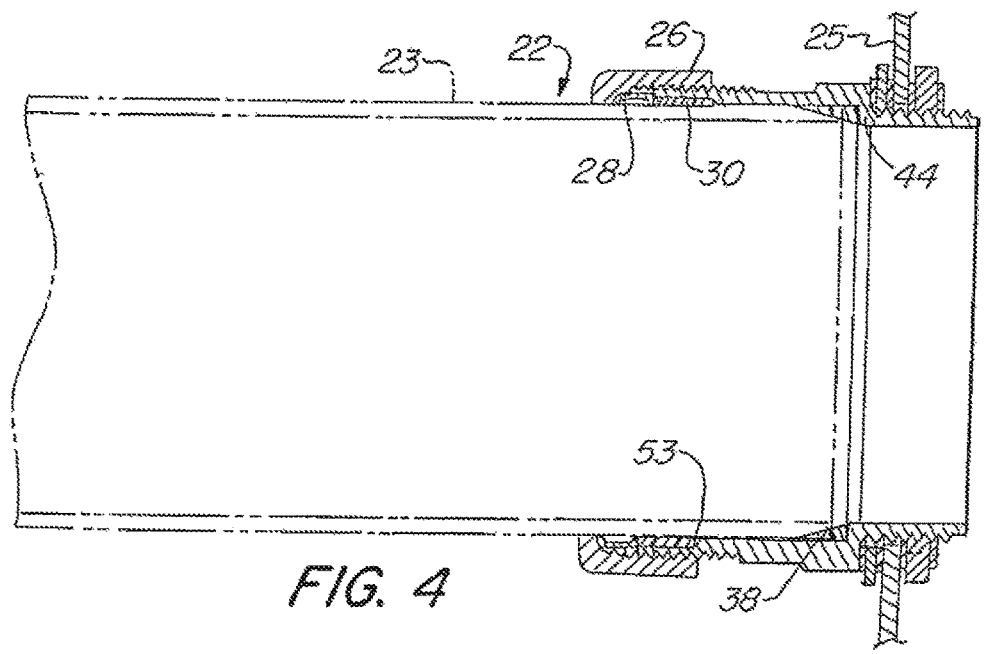
FIG. 4 is a cross-sectional view of the raintight compression connector taken along line 4-4 of FIG. 3.
Figure 5:
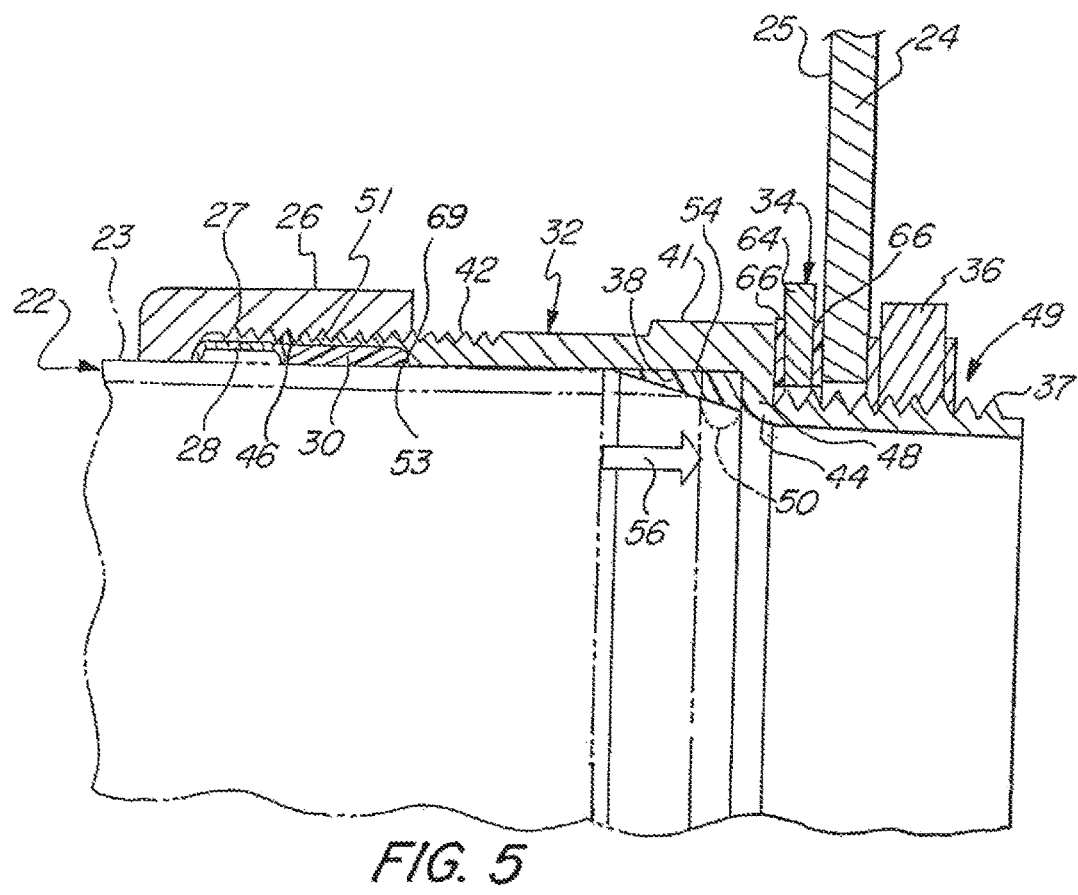
FIG. 5 is an enlarged cross-sectional view of the raintight compression connector shown in FIG. 4 illustrating how the EMT or RMC is advanced in the direction shown by an arrow so as to contact a secondary sealing seal.

The gland ring 28 and upper sealing ring 30 are dimensioned to be secured against an outer surface 23 of EMT or RMC 22 as best seen in FIGS. 4 and 5. The gland ring is typically manufactured from zinc plated spring steel while the upper sealing ring is typically manufactured from thermoplastic, such as polyethylene or polypropylene. The gland nut has threads 27 that interfit with threads 42 formed at a first end 46 of first end portion 47. The gland nut when threaded onto threads 42 compresses the gland ring 28 which in turn bites into outer surface 23 of conduit 22 and also presses against upper sealing ring 30.

Figure 6:
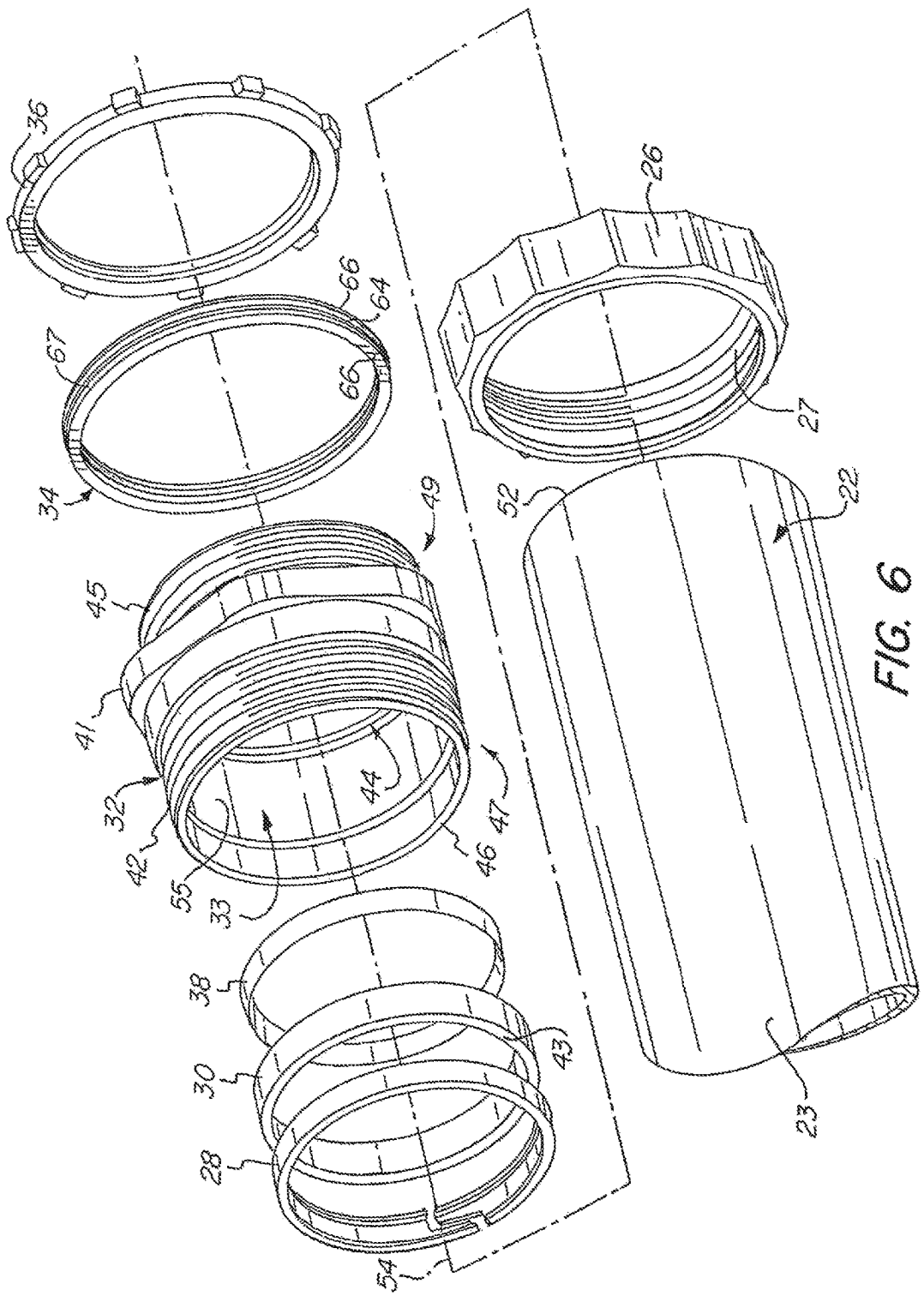
FIG. 6 is an exploded perspective view of the components of the raintight compression connector.

As seen in FIG. 6, conduit 22 is thus inserted into an open end 46 of connector body 32 until it engages with the stop seal 38. Arrow 56 shown in FIG. 5 illustrates the direction of movement of the conduit so that it presses into and forms a seal with stop seal 38 when the conduit is pressed into the stop seal against shoulder 44. Shoulder 44 is sometimes referred to as a conduit stop. The stop seal is dimensioned to thereby form a slight annular bulge 50 as shown in phantom in FIG. 5, thereby forming a watertight seal with conduit terminating face 52. Because the stop seal is pliable in nature, it can accommodate slight diameter tolerance variations for EMT or RMC 22. It can also tolerate out-of-round conditions of the conduit. Furthermore, it especially can accommodate the terminating face 52 of the EMT or RMC being slightly skewed (not at a right angle) relative to the longitudinal axis 54 of the EMT or RMC (see FIG. 6). Such skewing of the terminating face 52 can occur in the field when EMT or RMC is cut by hand, for example. Thus, the stop seal forms a secondary seal to prevent water intrusion into bore 33 of conduit 22.

The stop seal may be molded from silicone or other pliable material, such as ethylene propylene diene monomer (EPDM) class synthetic rubber. Other types of elastomer synthetic rubber or other pliable material may of course be used. The stop seal can be secured to shoulder 44 of connector body 32, as well as to the inner peripheral wall 55 of the connector body by use of a cyanoacrylate type glue or a silicone-based adhesive. Other means, including the use of other types of adhesives, for securing the stop seal to the connector body would of course be apparent to those skilled in the art. It can also be seated against shoulder 44 and inner peripheral wall 55 without the use of an adhesive, such as by frictional contact.

Figure 3:
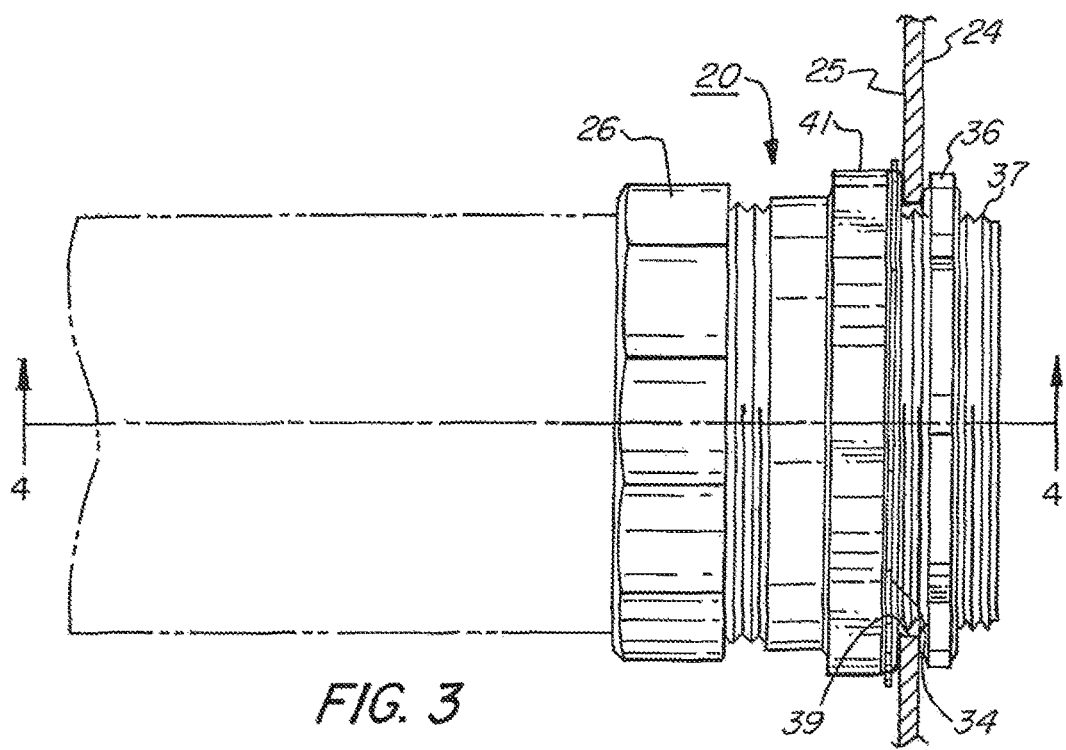
FIG. 3 is a side view of the raintight compression connector shown in FIG. 2.

FIGS. 3, 4, and 5 show how the raintight compression connector 20 is secured to an electrical enclosure 24 or other type of electrical housing or connecting body. Thus, knockout gasket 34 is compressed against the exterior of the electrical enclosure outer wall surface 35 by threaded engagement of locknut 36 with threads 37 formed in the second end portion 49 of connector body 32. This arrangement thereby pulls an outer flange 41 of connector body 32 against knockout gasket 34, which in turn forms a raintight seal against outer wall surface 35 of electrical enclosure 24. Outer flange 41 may have a multi-sided configuration with flat portions 68 to facilitate gripping during installation. Knockout gasket 34 typically is formed from a steel washer 64 having faces 67, with a pliable material 66 molded to at least a portion of both faces 67. The pliable material can be polyethylene, for example.

Although upper sealing ring 30 forms a primary seal to block the intrusion of water, it has been discovered that this primary seal may still allow some water entry beyond the seal region, which as discussed below is remedied by an improved sealing ring 30' according to the present invention. For large conduit trade sizes, such as 3.5 inch and 4 inch outer diameter (OD) conduit, there can be surface roughness and/or variation of conduit outer diameter (OD) (see FIG. 12) which can be accommodated by an improved upper sealing ring according to the present invention. The prior invention discloses an improved upper sealing ring 30' shown in FIGS. 11-17 that has a profile that can accommodate such surface roughness and/or OD tolerance variations of the conduit so as to allow the overall fitting 20 to meet Underwriter Laboratories raintight test number UL514 RT or similar type tests.

Figure 11:
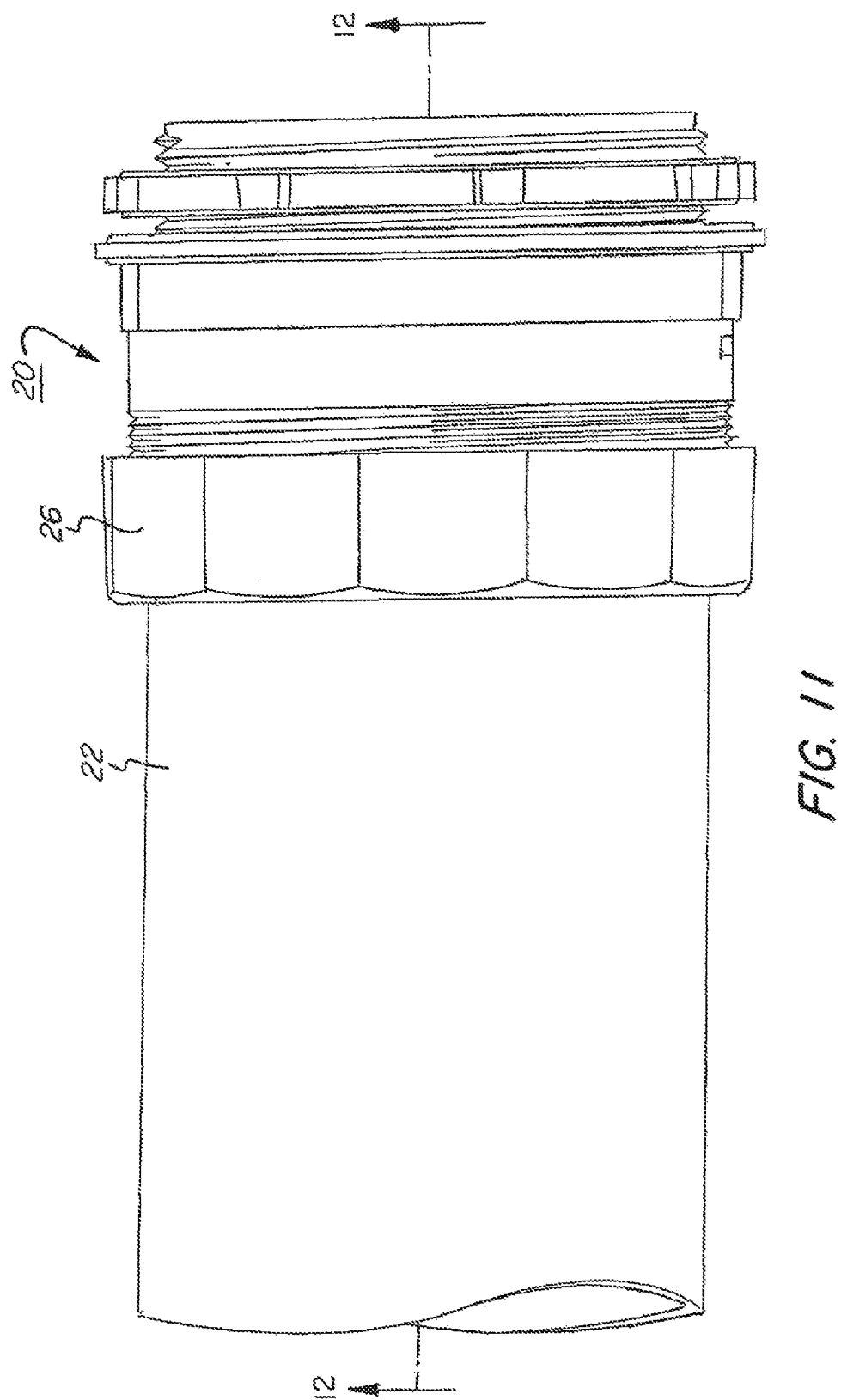
FIG. 11 is a side view of a raintight compression connector incorporating an improved upper sealing ring according to the present invention.
Figure 12:
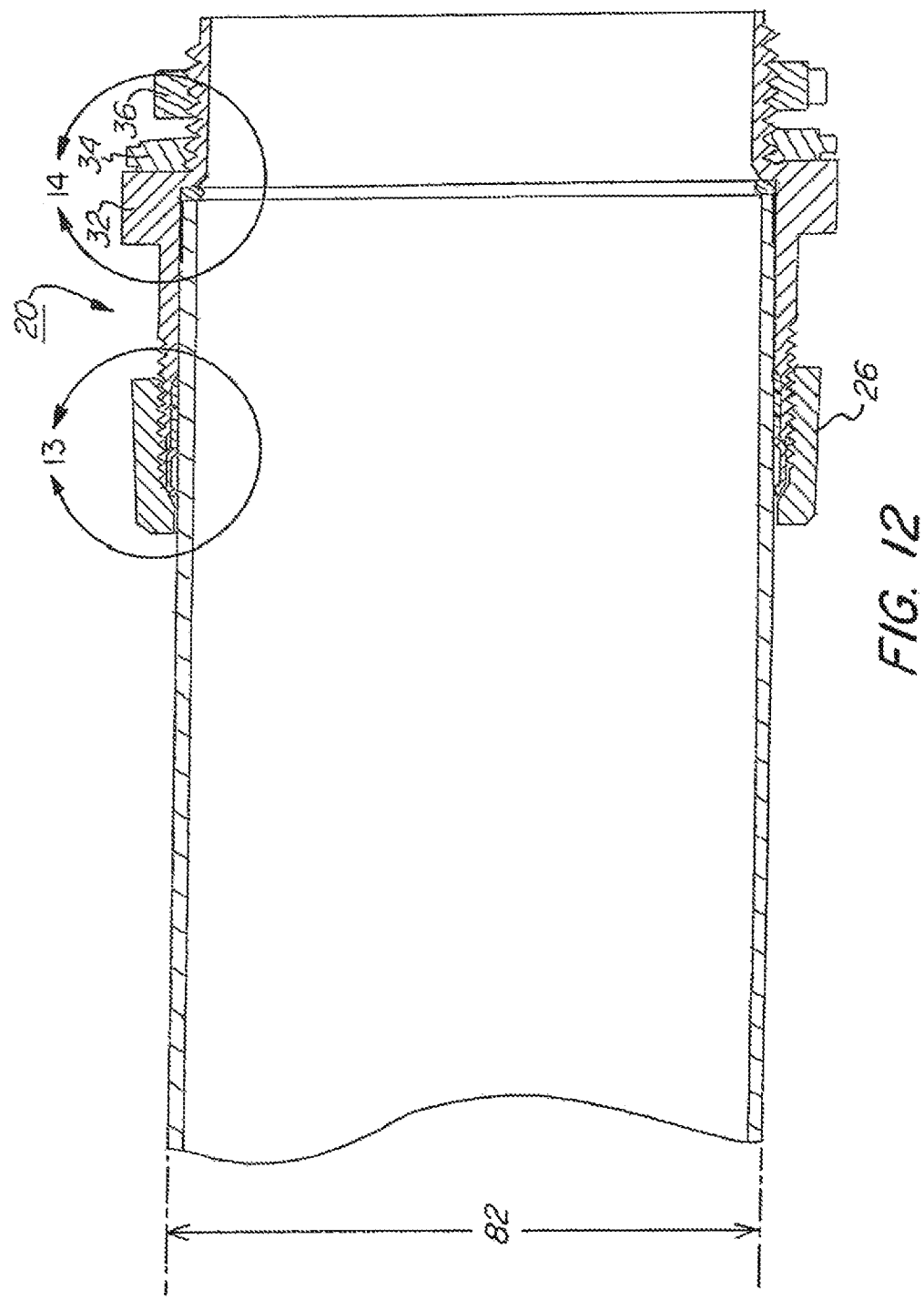
FIG. 12 is a cross-sectional view of the raintight compression connector taken along line 12-12 of FIG. 11.
Figure 13:
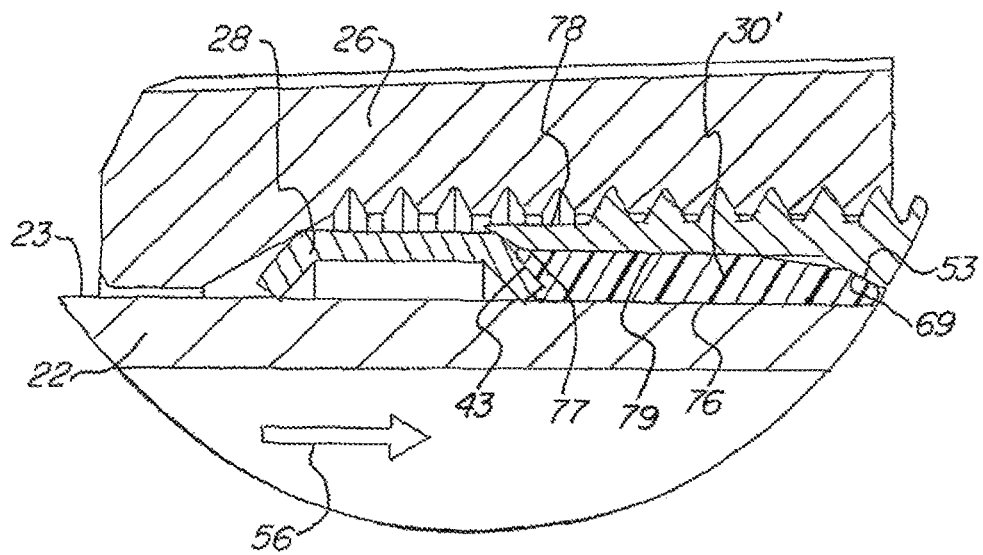
FIG. 13 is an enlarged cross-sectional view taken in the region of circle 13 shown in FIG. 12.
Figure 14:
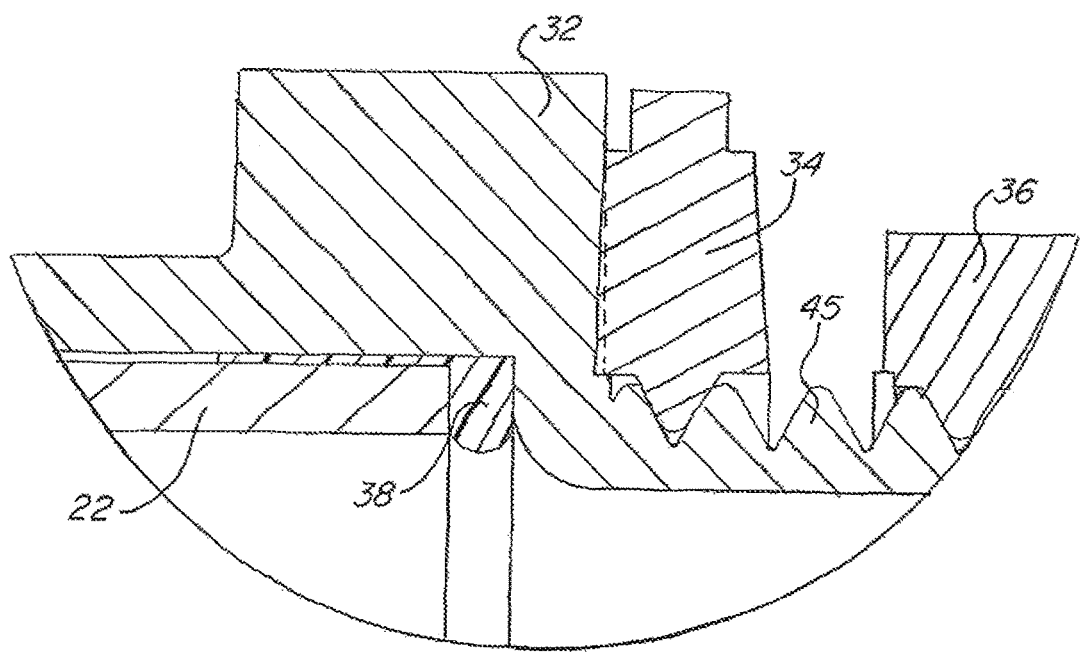
FIG. 14 is an enlarged cross-sectional view taken along circle 14 of FIG. 12 showing the conduit stop seal in its compressed configuration.
Figure 15:
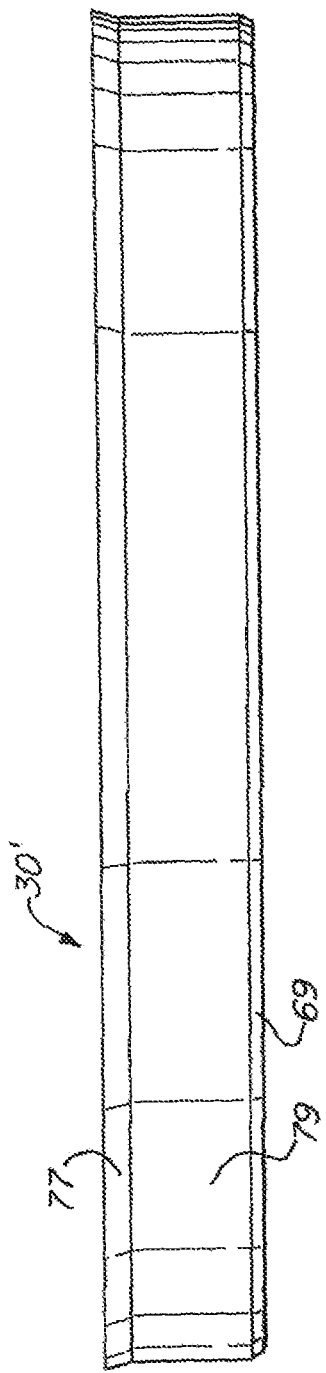
FIG. 15 is a side view of the upper sealing ring according to the present invention.

The prior invention improvement is that the upper sealing ring 30' shown in FIGS. 11-13 is configured to have a non-compressed cross-sectional shape as shown in FIGS. 15-17. It has been experimentally determined that this profile of upper sealing ring 30' facilitates the overall raintight operation of the raintight compression connector and raintight compression coupler, especially with regard to meeting Underwriter Laboratories test UL514B RT, and that this improved upper sealing ring is particularly advantageous for raintight compression connectors and raintight compression couplers in the 3.5 inch and 4 inch sizes (and other large trade sizes) associated with electrical metallic tubing (EMT) and the like.

As best seen in FIGS. 13, and 15-17, the prior invention improved sealing ring 30' has three regions 70, 71 and 72. The first region has a first sloping surface 69 that is configured to contact a recess shoulder 53 of connector body 32. The upper sealing ring second region 71 is formed between first region 70 and third region 72. The third region has a third sloping surface 77 as seen in FIGS. 15-17. This sloping surface is compressed so as to make contact with inner surface 78 of connector body 32 when the upper sealing ring 32 is urged in the direction of arrow 56 by gland ring 28 as the gland ring is forced in that direction by the threaded tightening of gland nut 26. The gland ring presses end surface 43 of the upper sealing ring. The end surface acts as a bearing surface that drives third sloping surface into the space between the inner surface 78 of connector body 32 and the outer surface 23 of conduit 22 (see FIG. 13). As seen in FIG. 13, outer surface 79 (second sloping surface) of second region 71 also makes contact with inner surface 78 of connector body 32. As such contact with the connector body occurs, the flat lower surface 76 of the upper sealing ring makes contact with outer surface 23 of conduit 22.

It has been experimentally discovered that due to the overall profile of upper sealing ring 30', a raintight seal can be achieved for large trade size conduit, including in the 3½ inch outer diameter (OD) and four inch OD trade sizes, which can have a significant tolerance variation in outer diameter and which can have significant roughness to the outer surface 23 of the conduit.

For a four inch trade size upper sealing ring shown in FIGS. 15-17, first sloping surface 69 has a slope of approximately 30 degrees (±0.5 degree) relative to surface 76 of the upper sealing ring, second sloping surface 79 has a slope of approximately 0.85 degree (±0.5 degree), and third sloping surface 77 has a slope of approximately 10 degrees (±0.5 degree). The relative length of first region 70, second region 71 and third region 72 to overall length 80 of upper sealing ring 30 is 6.5 percent, 70.2 percent and 23.3 percent.

Figure 19:
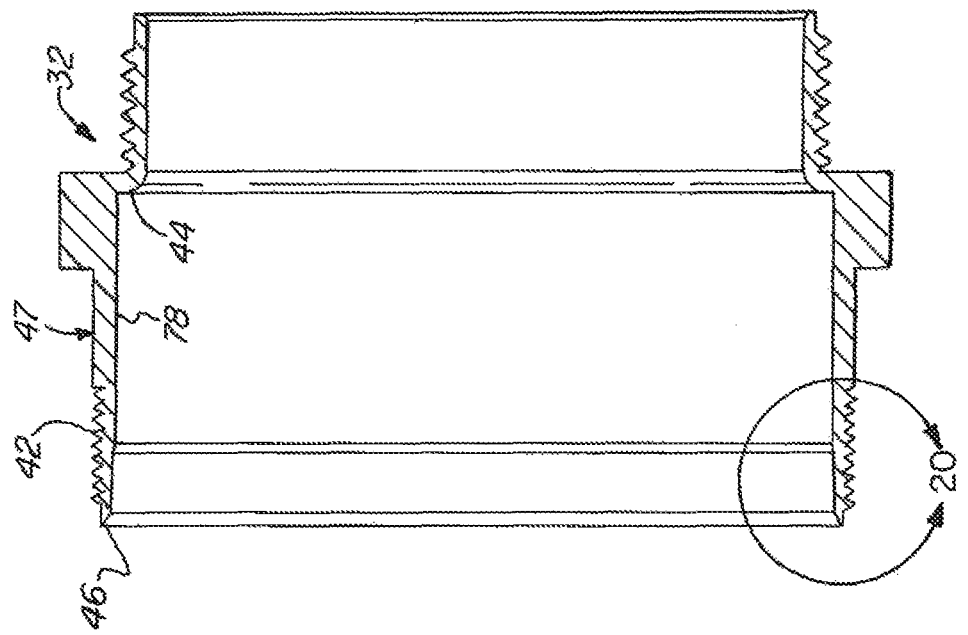
FIG. 19 is a cross-sectional view of the connector body taken along line 19-19 shown in FIG. 18.
Figure 18:
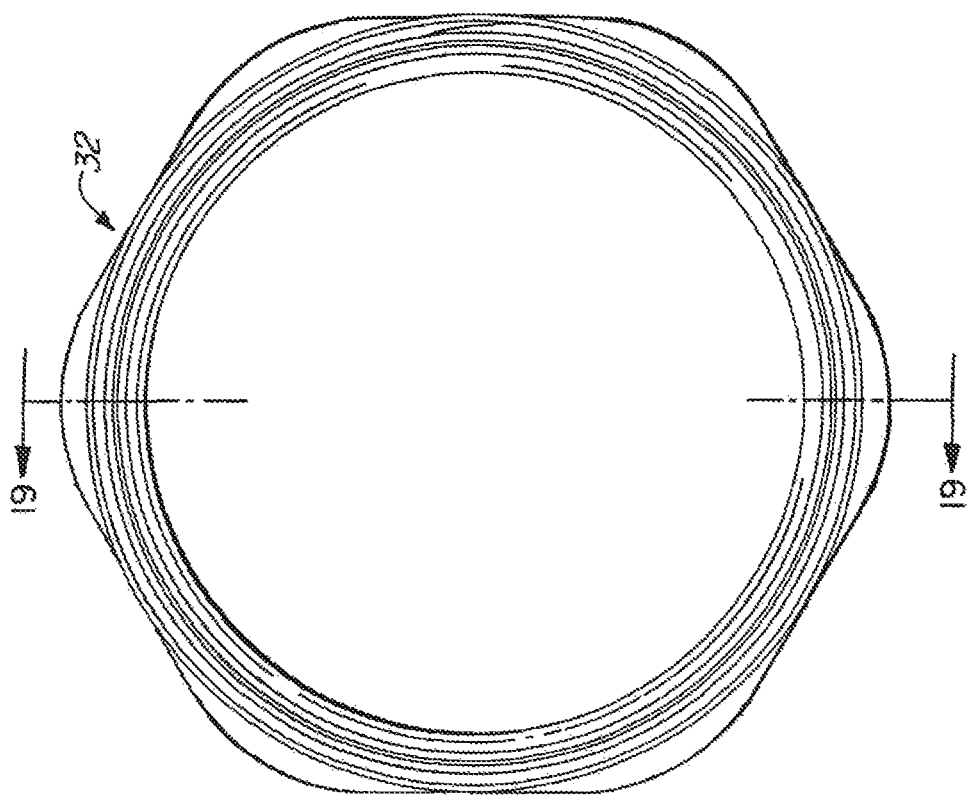
FIG. 18 is a top plan view of the connector body forming part of the raintight compression connector.
Figure 20:
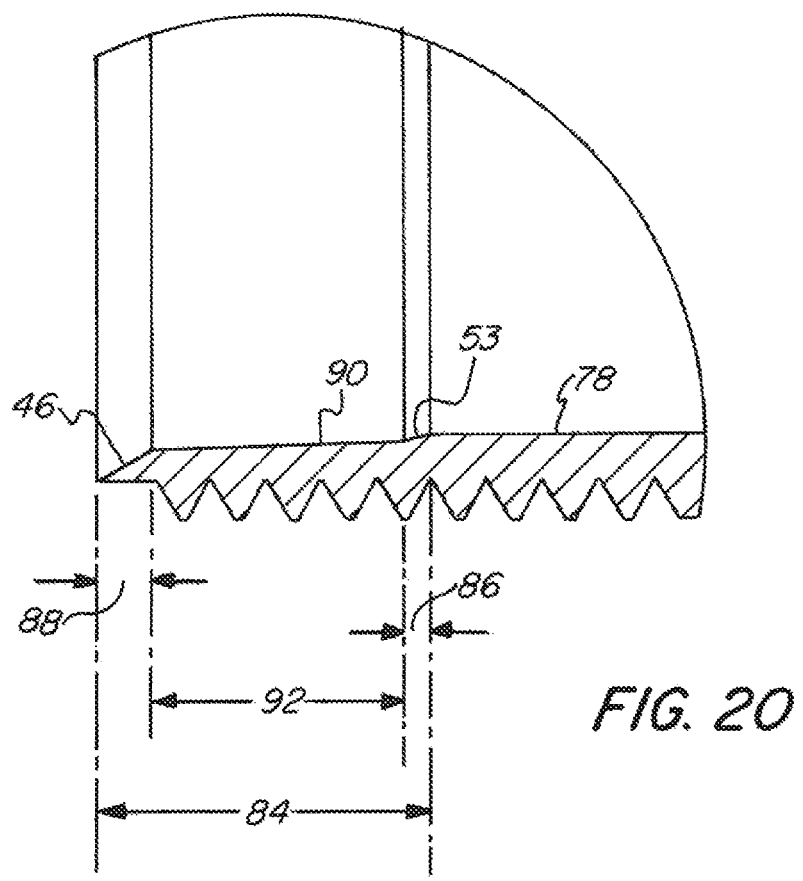
FIG. 20 is an enlarged view of a portion of the connector body taken around circle 20 shown in FIG. 19.

Slight variation in the above-described profile of upper sealing ring 30' is possible while achieving raintight sealing of the conduit by the compression connector, but the profile of the upper sealing ring as shown in FIGS. 15-17 is the preferred profile. These preferred dimensions of the prior invention improved upper sealing ring 30' are with respect to connector body dimensions shown in FIGS. 18-20. FIG. 18 shows connector body 32 for use with a four inch trade size conduit. FIG. 19 is a cross-sectional view taken along line 19-19 of FIG. 18, while FIG. 20 shows an enlarged view of recess shoulder 53 and first end 46 of first portion 47 of the connector body 32. It is there seen that the recess shoulder has a slope of 15 degrees (±0.5 degree) relative to longitudinal axis 54 (see FIG. 6) and first end 46 has a chamfered configuration with an angle of 30 degrees (±0.5 degrees) relative to axis 54.

The first portion 47 starting at recess shoulder 53 has an overall length designated by reference numeral 84. With respect to this overall length, the recess shoulder has a relative length 86 of 8 percent, first end 46 has a relative length 88 of 16 percent, and middle section 90 has a relative length 92 of 76 percent. Middle section 90 also has a slope (second sloping surface 79) of 2 degrees (±0.5 degree) relative to axis 54.

As seen in FIGS. 13, 19 and 20, threaded tightening of gland nut 26 onto connector body 32 urges gland ring 28 to move in the direction of arrow 56. As described above, gland nut 26 when threaded onto threads 42 compresses gland ring 28 which in turn bites into outer surface 23 of conduit 22 and also presses against end surface 43 (edge) of upper sealing ring 30' (see FIG. 17). This urging of the upper sealing ring forces first sloping surface 69 into contact with recess shoulder 53 formed in first end portion 47 of connector body 32 (in cutout region 51). This urging of the upper sealing ring against recess shoulder 53 thus causes the upper sealing ring first sloping surface 69 to press against inner surface 78 of first portion 47 and for lower surface 76 of the upper sealing ring to press against outer surface 23 of EMT or RMC 22. In addition, third sloping surface 77 also presses against inner surface 78 while a portion of second sloping surface 79 may similarly presses against inner surface 78. This is best seen in FIG. 13.

This arrangement of components allows the raintight compression connector to accommodate the allowed nominal variations in outer diameters of conduit 22, as well as variations in the outer surface conditions (roughness) of the conduit and out-of-round conditions of the conduit (that may result from clamping the conduit, dropping the conduit, etc.), while maintaining a sealed relationship between the raintight compression connector and the conduit.

Figure 7:
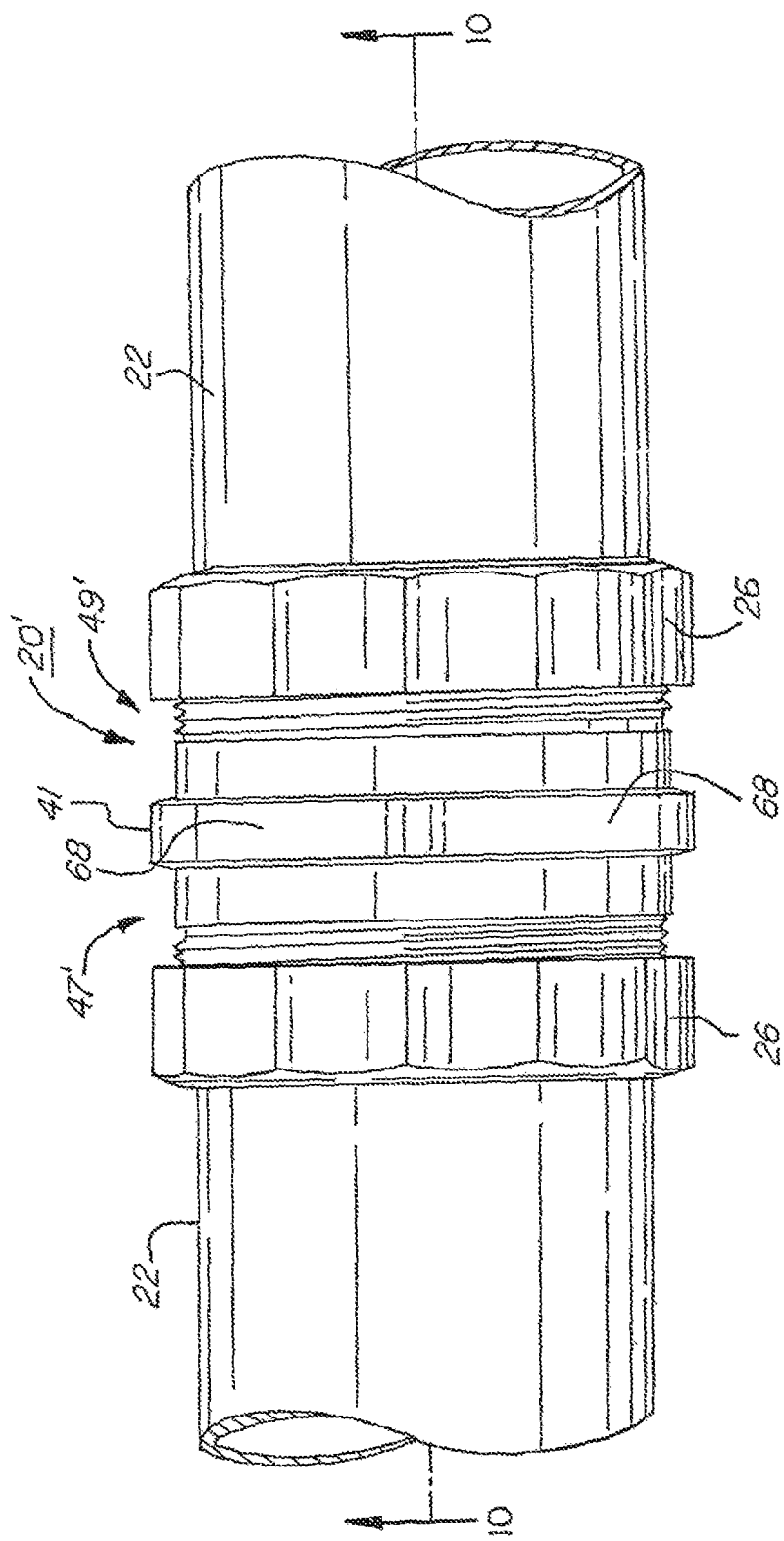
FIG. 7 is a side view of a raintight compression coupler according to an embodiment of the present invention, the coupler attached to two EMT's or RMC's.
Figure 8:
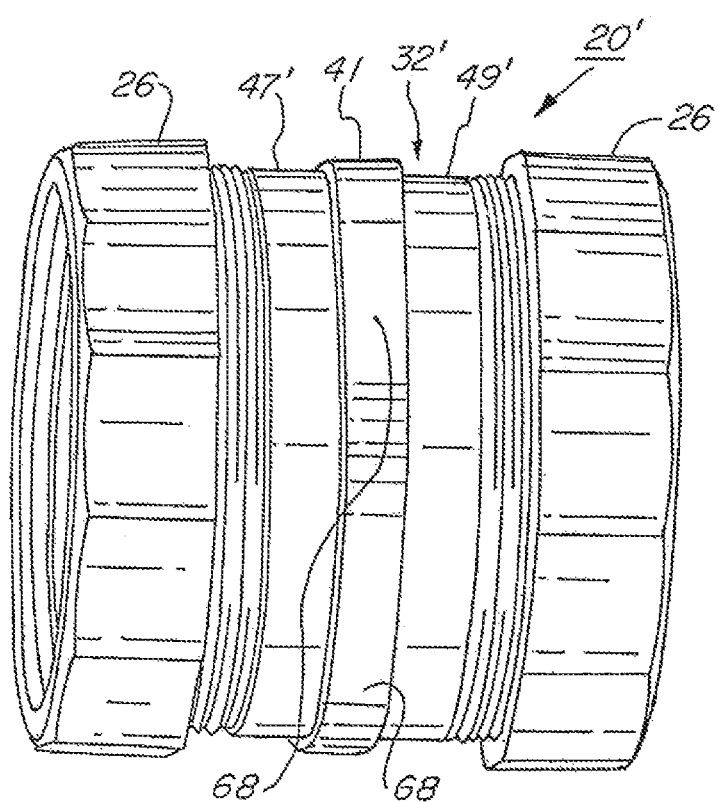
FIG. 8 is a perspective view of the raintight compression coupler shown in FIG. 7 without the EMTs or RMC's attached.
Figure 9:
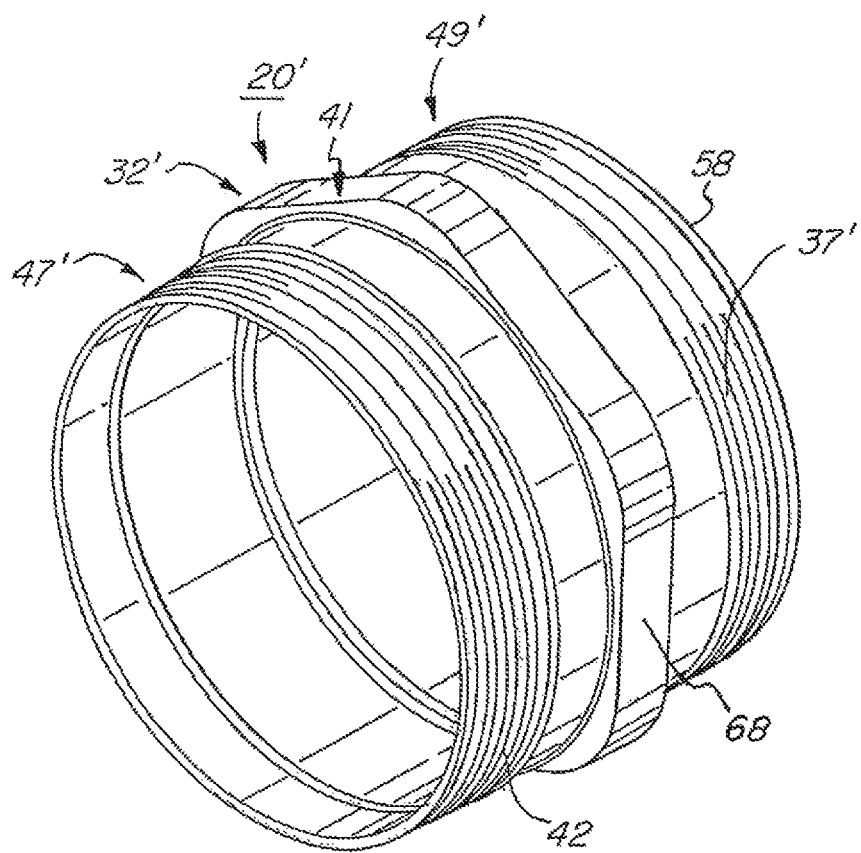
FIG. 9 is a perspective view of the raintight compression coupler without the gland nuts attached.
Figure 10:
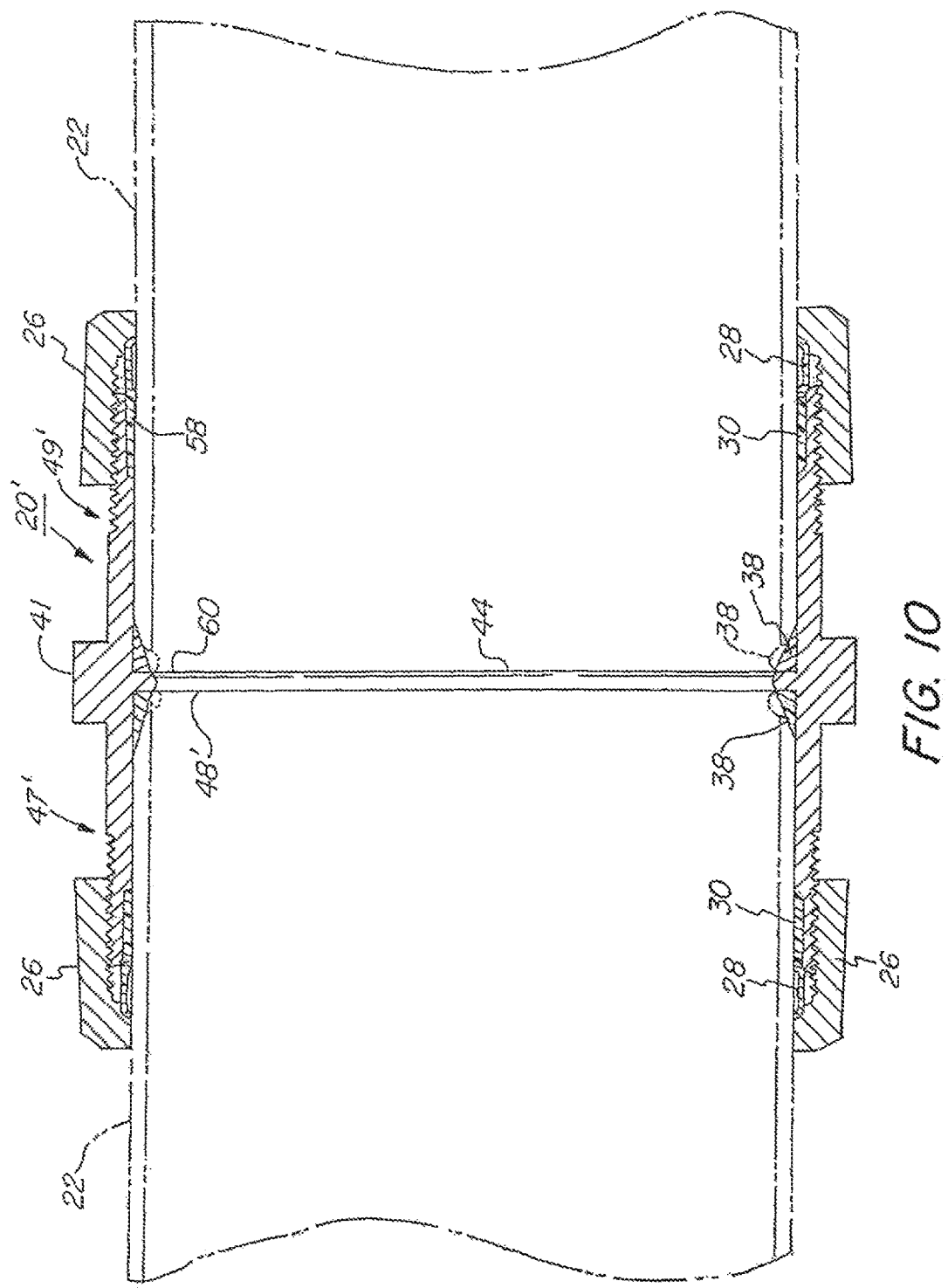
FIG. 10 is a cross-sectional view of the raintight compression coupler taken along line 10-10 of FIG. 7, showing the EMT's or RMC's and stop seals in dashed lines when the conduits are inserted into the coupler, the latter as deformed by the EMTs or RMC's so as to form a substantially raintight seal therewith.

FIGS. 7-10 show another embodiment of the prior invention directed to a raintight compression coupler 20'. The coupler is for connection to two EMTs or RMC's 22. FIG. 8 shows that the coupler has a first portion 47' corresponding to first portion 47 of raintight compression connector 20. Second portion 49' is the mirror image of first portion 47'. Flange 41' is positioned at the junction of first portion 47' and second portion 49'. It has a multi-sided configuration with flat portions 68 to facilitate gripping during installation. As seen in FIG. 10, raintight compression coupler 20' has gland rings 28, upper sealing rings 30, and stop seals 38 corresponding to those components for raintight compression connector 20, with corresponding components for both first portion 47' and second portion 49'. The prior invention improvement to these upper sealing rings 30' is shown in FIGS. 12-17 as described above. Shoulder (conduit stop) 44 is at the second end 48' of first portion 47' and at second end 60 of second portion 49'. The stop seals for the first and second portion 47' and 49' are positioned against this shoulder and secured to connector body 32' typically by use of a cyanoacrylate type glue or silicone-based adhesive. Although one shoulder is shown, two separate shoulders with a space therebetween could be used. Second external threads 37' are formed in second portion 49' at first end 58 thereof.

Each conduit 22 is therefore secured to raintight compression coupler 20' in the same manner as conduit 22 is secured to raintight compression connector 22. For both connector 20 and coupler 20', a raintight securement of an EMT or RMC is achieved in a manner that accommodates tolerance variations in the outer diameter of the EMT or RMC, variations in outer surface conditions of the EMT or RMC, out-of-round conditions of the EMT and skewed terminating face conditions of the EMT or RMC.

Co-Molded Sealing Ring 30*

Figure 2:
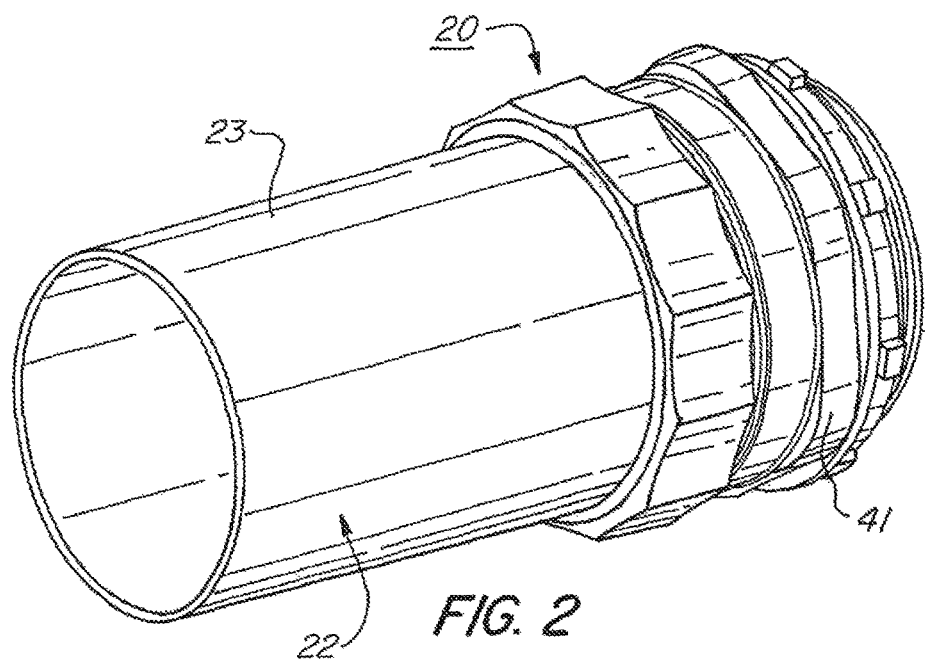
FIG. 2 is a perspective view of an electrical metallic tubing (EMT) or Rigid Metallic Conduit (RMC) inserted into the raintight compression connector shown in FIG. 1.
Figure 21:
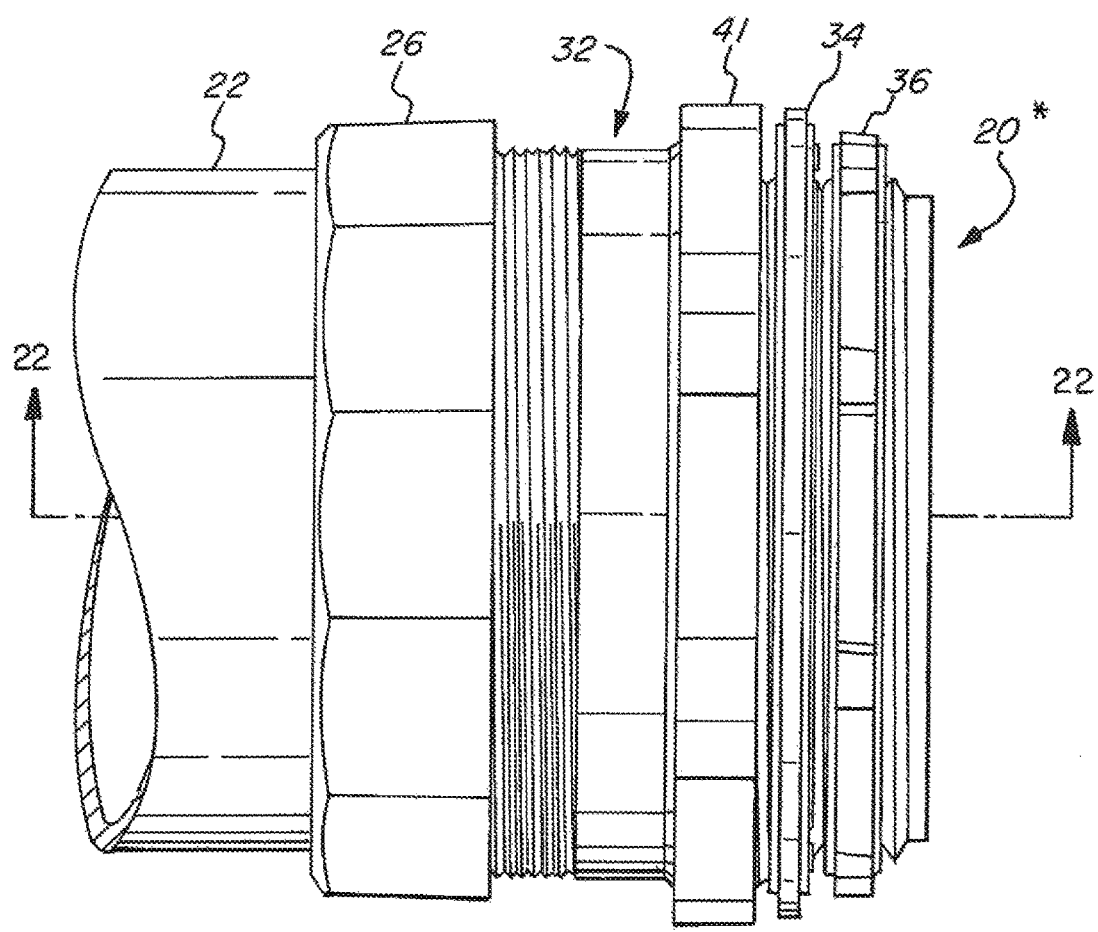
FIG. 21 is a side view of an electrical fitting (raintight compression connector) incorporating a co-molded sealing ring according to an embodiment of the present invention.

The improvement of the present invention is with respect to an improved sealing ring 30*. This sealing ring is a co-molded sealing ring (described below) and is used in conjunction with electrical fittings, including a raintight compression connector 20 as seen in FIGS. 1-3 and a raintight compression coupler 20' as seen in FIGS. 7-9. This co-molded sealing ring is shown in FIGS. 21-28 and can be used in electrical fittings, including both raintight compression connectors and raintight compression couplers as described above. Thus, FIG. 21 shows a raintight compression connector 20* corresponding to the raintight compression connector 20 as shown in FIGS. 1-3. FIG. 22 is a cross-sectional view of this raintight compression connector 20* taken along line 22-22 of FIG. 21.

Figure 23:
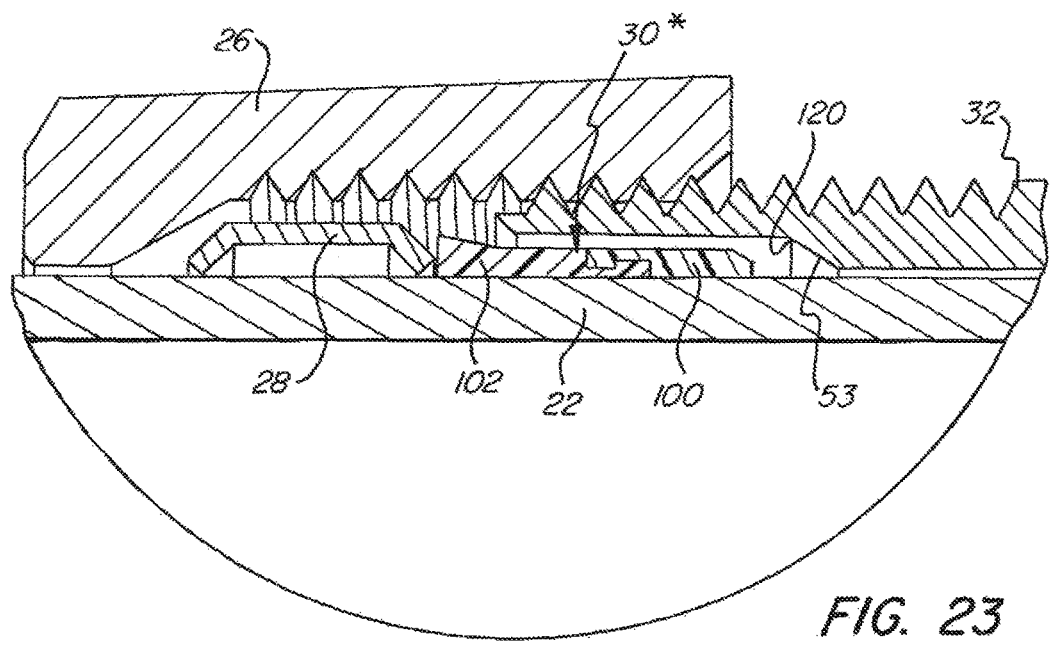
FIG. 23 is an enlarged view of a portion of the electrical fitting shown in FIG. 22 taken along circle 23 shown in FIG. 22, showing the co-molded sealing ring in an uncompressed state.
Figure 25:
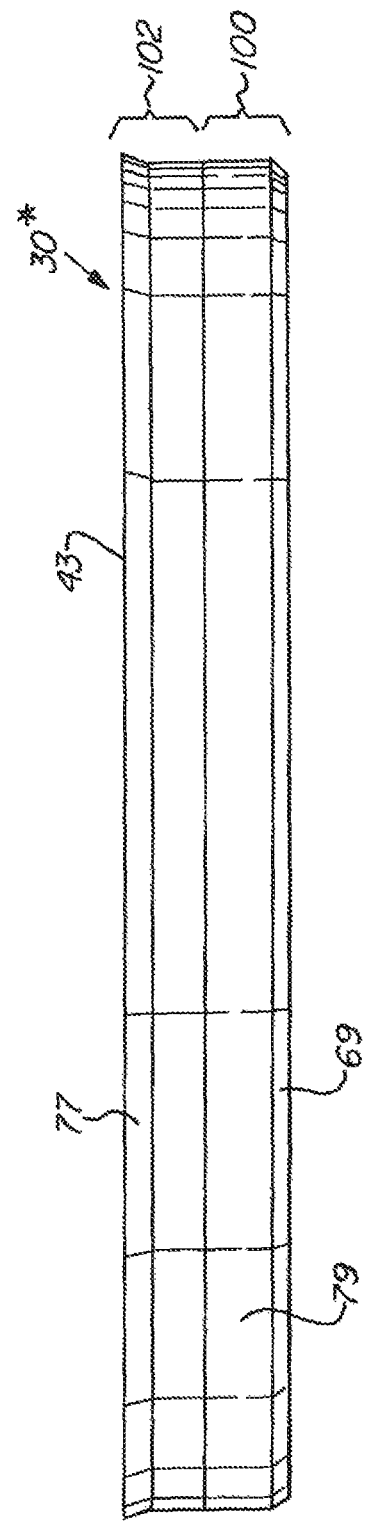
FIG. 25 is a side view of the co-molded sealing ring in the uncompressed state.

In this view, the co-molded sealing ring 30* is shown in an uncompressed state. This uncompressed state of the sealing ring and associated components of the raintight compression connector are shown in FIG. 23, an enlarged view taken along circle 23 of FIG. 22. As seen in FIG. 23, the co-molded sealing ring 30* is fabricated from two materials, a first segment 100 fabricated from a thermoplastic elastomer (TPE) material sometimes referred to as thermoplastic rubber, and a second segment 102 fabricated from a medium-density polyethylene (MDPE) material. The TPE material is readily deformable, while the MDPE material is harder than the TPE material and thus is less deformable as compared to the TPE material. The two segments of the sealing ring are co-molded to each other. To facilitate the co-molding (joining) of the two segments of the sealing ring, the first segment has a circumferential rim 106 at one end thereof and a circumferential notch 108 adjacent the rim. A similar circumferential rim 110 is formed at an end of the second segment along with a circumferential notch 112 adjacent thereto. These details are best seen in FIGS. 23-25, 27 and 28. The first segment has a lower surface 76 and the second segment has a lower surface 76', both of which are preferably smooth and adjacent each other.

The co-molding of the first and second segments to each other can be accomplished with other configurations with respect to the adjoining ends of the first and second segments, such as without using a rim and notch on each segment but, for example, abutting each segment to the other segment. The rim and notch arrangement is a preferred embodiment of the co-molded sealing ring.

Figure 24:
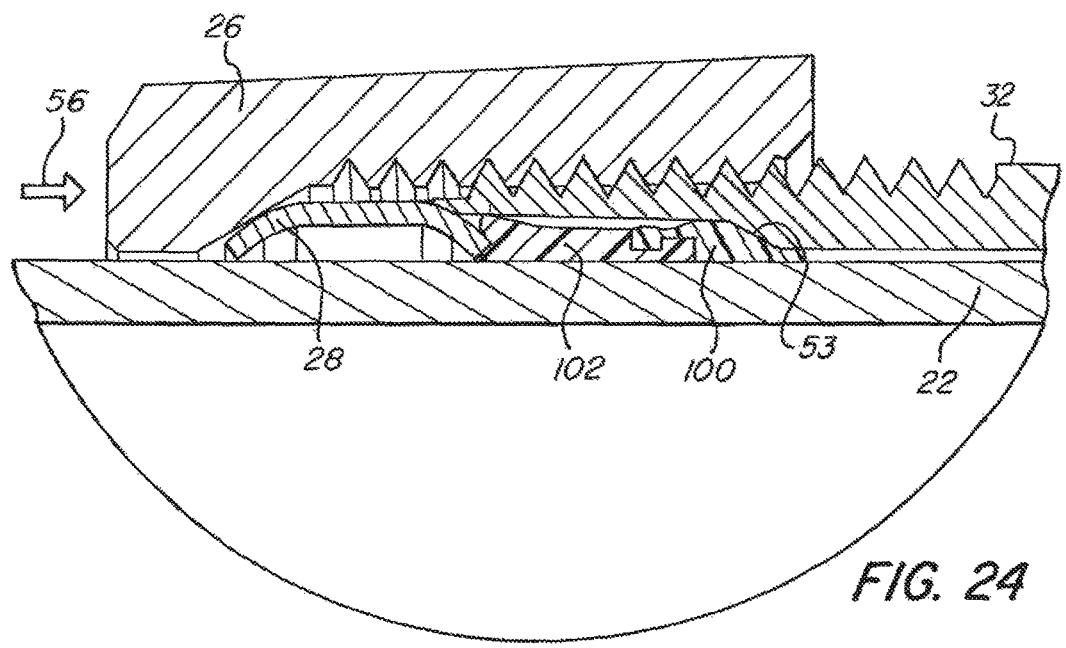
FIG. 24 is an enlarged view of the portion of the electrical fitting shown in FIG. 23, showing the co-molded sealing ring in a compressed state.

As seen in FIG. 24, when gland nut 26 is tightened about connector body 32 so as to move gland ring 28 in the direction of arrow 56, the gland ring contacts an end surface 43 of second segment 102, thereby urging the first section 100 into contact with the inner surface 78 of connector body 32, including recess shoulder 53 (see also FIG. 20), thereby at least partially filling a space 120 formed between first segment 100 and the inner surface 78 of the connector body. It has been determined that when the co-molded sealing ring is in the compressed state as shown in FIG. 24, the first segment 100 at least partially fills space 120 so as to form a raintight seal between the inner surface 78 of connector body 32 and outer surface 23 of conduit 22. This raintight seal can be achieved without the use of a stop seal, such as stop seal 38 shown in a prior embodiment as seen in FIG. 5. Thus, as see in FIG. 22, the conduit 22 can abut shoulder 44 of the connector body without use of such a stop seal.

The co-molded sealing ring 30* can have first, second and third regions 70, 71 and 72 as shown in FIGS. 24-28 with sloping surfaces 69, 79 and 77 respectively corresponding to those discussed previously with regard to upper sealing ring 30'. The difference between the co-molded sealing ring 30* in this embodiment and the previously-described upper sealing ring 30', is the use of the TPE material in the first segment of the sealing ring and the MDPE material in the second segment of the sealing ring. Although the first sloping surface 69 of co-molded sealing ring 30* is shown to contact recess shoulder 53 of the inner surface 78 of connector body 32 with the connector body having a shape as shown in FIG. 20, an embodiment of the co-molded sealing ring 30* fabricated from the TPE and MDPE materials may also be used with a connector body 32 not having an inner surface 78 with the specific dimensions shown in FIG. 20. The co-molded sealing ring may have first and second segments 100 and 102 without all or some of regions 70, 71 and 72 and their corresponding sloping surfaces 69, 79 and 77.

Thus, as shown in FIGS. 21-22 (see also FIGS. 1-3 and 18-20 for reference numerals) the present invention is also directed to a raintight compression connector 20* comprising a connector body 32 having a first portion 47 and a second portion 49 and a bore 33 extending through the first portion and the second portion, the first portion dimensioned for receipt of a conduit 22 in said bore, a gland nut 26 having internal threads 27 dimensioned for threaded engagement with first external threads 42 formed in the first portion, a gland ring 28 dimensioned for contact with the gland nut so as to secure the gland nut and the first portion of the connector body to the conduit when the conduit is inserted into the first portion, a co-molded sealing ring 30* dimensioned for contact with the first portion of the connector body so as to make sealing contact with the conduit when the conduit is inserted into the first portion, said co-molded sealing ring having a first region 70, a second region 71 and a third region 72, the second region formed between the first and third regions, the first region having a first sloping surface 69 dimensioned to contact a recess shoulder 53 in the bore of the first portion of the connector body and the third region having a third sloping surface 77 dimensioned to contact an inner surface 78 of the first portion of the connector body, wherein a first segment 100 of the co-molded sealing ring, comprising the first region and a portion of the second region, is formed from a thermoplastic elastomer material so that a space formed between the first segment and the inner surface of the connector body adjacent said recess shoulder when the co-molded sealing ring is in an uncompressed state (see FIG. 23), is at least partially filled by the first segment when the co-molded sealing ring is in a compressed state (see FIG. 24), and wherein a second segment 102 of the co-molded sealing ring, comprising a remainder of said second region and said third region, is formed from a medium-density polyethylene material, said second segment having an end surface 43 positioned away from the first segment, said end surface dimensioned for contact by the gland ring so as to urge the co-molded sealing ring into the compressed state, and further wherein the first and second segments each have a lower surface 76, 76' respectively, dimensioned to contact an outer surface 23 of a conduit 22 positioned within said bore of the connector body; whereby a raintight seal is established between the electrical fitting and the conduit when the sealing ring is in the compressed state without the use of a stop seal between the conduit and a conduit stop 44, wherein the connector body has an outer flange 41 and wherein the second portion of the connector body is dimensioned for receipt of a knockout gasket 34, the second portion having second external threads 37 dimensioned for receipt of a locknut 36 for securing the knockout gasket positioned around a knockout hole 39 in an electrical enclosure 24 between said outer flange and the electrical enclosure, thereby forming a raintight seal therewith.

Figure 28:
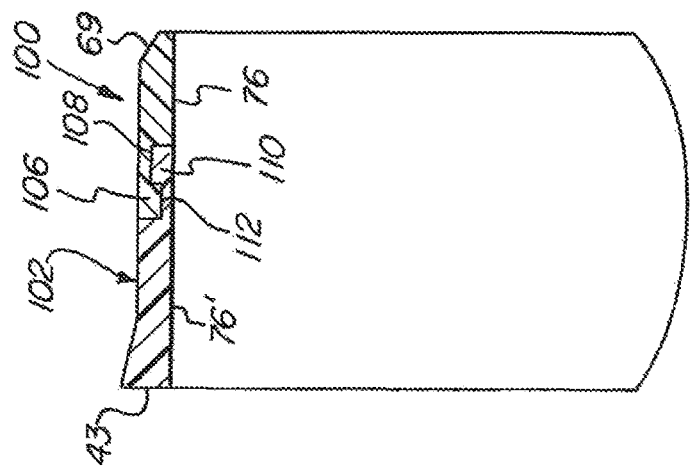
FIG. 28 is an enlarged cross-sectional view of the profile of the co-molded sealing ring taken along circle 28 of FIG. 27.
Figure 27:
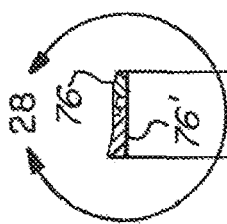
FIG. 27 is a cross-sectional view of the co-molded sealing ring taken along line 27-27 of FIG. 26.
Figure 26:
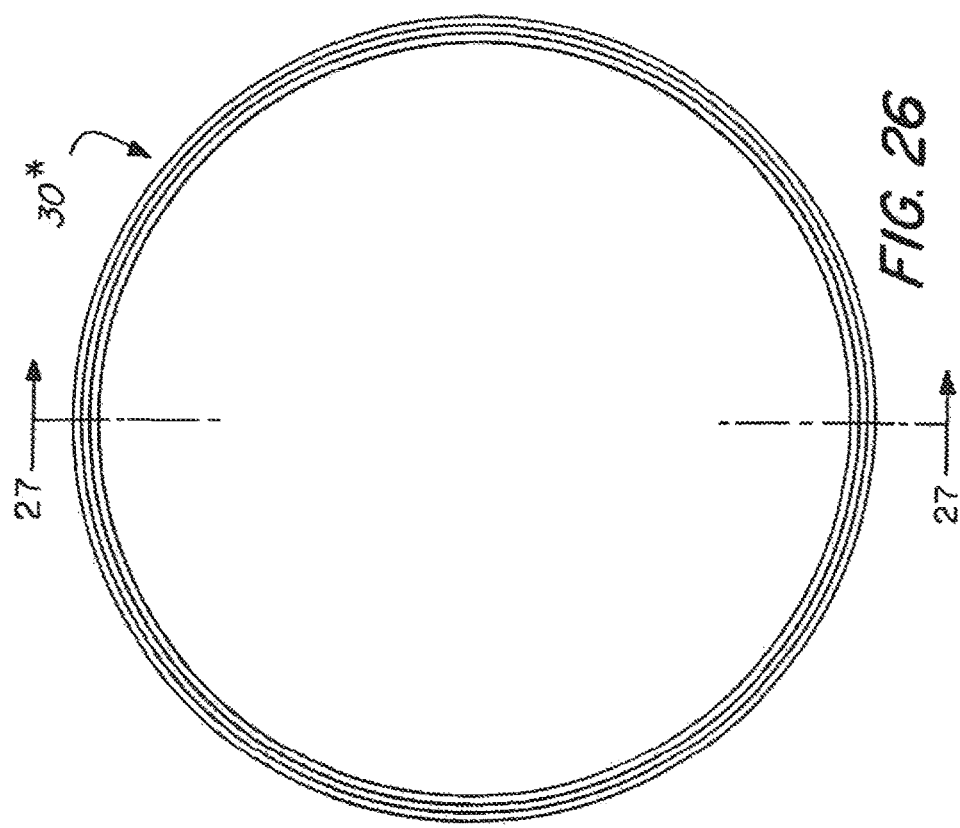
FIG. 26 is a top plan view of the co-molded sealing ring shown in FIG. 25.

This raintight compression connector can have slopes for the first, second and third sloping surfaces the same as shown in FIG. 28; namely, approximately 30 degrees for the first sloping surface 69 relative to the lower surface 76 of the co-molded sealing ring, approximately 2 degrees for the second sloping surface 79 relative to the lower surface of the co-molded sealing ring, and approximately 10 degrees for the third sloping surface 77 relative to the lower surface of the co-molded sealing ring.

The raintight compression connector can also have an overall length 80 as shown in FIG. 28 and wherein the first region 70, second region 71 and third region 72 have a relative length of 6.5 percent, 70.2 percent and 23.3 percent respectively.

As shown in FIGS. 7-10, a raintight compression coupler 20* comprises a connector body 32 having a first portion 47 and a second portion 49 and a bore 33 extending through the first portion and the second portion, the first portion dimensioned for receipt of a conduit 22 in said bore, the first portion having a first end 46 and a second end 48 and the second portion dimensioned for receipt of a conduit 22 in said bore, the second portion having a first end 58 and a second end 60, a first gland nut 26 having internal threads 27 dimensioned for threaded engagement with first external threads 42 formed in the first portion at its first end, a first gland ring 28 dimensioned for contact with the first gland nut so as to secure the first gland nut and the first portion of the connector body to a first conduit when the first conduit is inserted into the first portion, a first co-molded sealing ring 30* dimensioned for contact with the first portion of the connector body so as to make sealing contact with the first conduit when the first conduit is inserted into the first portion, said first co-molded sealing ring having a first region 70, a second region 71 and a third region 72, the second region formed between the first and third regions, the first region having a sloping surface 69 dimensioned to contact a recess shoulder 53 in the bore of the first portion of the connector body and the third region having a sloping surface 77 dimensioned to contact an inner surface 78 of the first portion of the connector body, wherein a first segment 100 of the co-molded sealing ring, comprising the first region and a portion of the second region, is formed from a thermoplastic elastomer material so that a space formed between the first segment and the inner surface of the connector body adjacent said recess shoulder when the co-molded sealing ring is in an uncompressed state, is substantially filled by the first segment when the co-molded sealing ring is in a compressed state, and wherein a second segment 102 of the co-molded sealing ring, comprising a remainder of said second region and said third region, is formed from a medium-density polyethylene material, said second segment having an end surface 43 positioned away from the first segment, said end surface dimensioned for contact by a gland ring so as to urge the co-molded sealing ring into the compressed state, and further wherein the first and second segments each have a lower surface 76, 76' respectively, dimensioned to contact an outer surface 23 of a conduit 22 positioned within said bore of the connector body, whereby a raintight seal is established between the electrical fitting and the conduit when the sealing ring is in the compressed state, and a second gland nut having internal threads dimensioned for threaded engagement with second external threads formed in the second portion at its first end, a second gland ring dimensioned for contact with the second gland nut so as to secure the second gland nut and the second portion of the connector body to the second conduit when the second conduit is inserted into the second portion, and a second co-molded sealing ring dimensioned for contact with the second portion of the connector body so as to make sealing contact with the second conduit when the second conduit is inserted into the second portion, said second co-molded sealing ring having a first, second and third region, the second region formed between the first and third regions, the first region having a sloping surface dimensioned to contact a recess shoulder in the bore of the first portion of the connector body and the third region having a sloping surface 69 dimensioned to contact an inner surface 78 of the second portion of the connector body wherein a first segment of the co-molded sealing ring, comprising the first region and a portion of the second region, is formed from a thermoplastic elastomer material so that a space formed between the first segment and the inner surface of the connector body adjacent said recess shoulder when the co-molded sealing ring is in an uncompressed state, is at least partially filled by the first segment when the co-molded sealing ring is in a compressed state, and wherein a second segment of the co-molded sealing ring, comprising a remainder of said second region and said third region, is formed from a medium-density polyethylene material, said second segment having an end surface positioned away from the first segment, said end surface dimensioned for contact by a gland ring so as to urge the co-molded sealing ring into the compressed state, and further wherein the first and second segments each have a lower surface dimensioned to contact an outer surface of a conduit positioned within said bore of the connector body, whereby a raintight seal is established between the electrical fitting and the conduit when the sealing ring is in the compressed state.

The present invention is thus directed to a co-molded sealing ring 30* for use with electrical fittings including raintight compression connectors and raintight compression couplers, as well as the corresponding raintight compression connector and raintight compression coupler incorporating the co-molded sealing ring.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A co-molded sealing ring for use in an electrical fitting, the co-molded sealing ring having an uncompressed state and a compressed state, the co-molded sealing ring comprising a first segment formed from thermoplastic elastomer and a second segment co-molded to the first segment, formed from a medium-density polyethylene material attached at an end thereof to an end of the first segment, wherein a space formed between the first segment and an inner surface of a connector body of the electrical fitting when the co-molded sealing ring is in the uncompressed state, is at least partially filled by a portion of the first segment when the co-molded sealing ring is in the compressed state, wherein said second segment has an end surface positioned away from the first segment, said end surface of the second segment dimensioned for contact by a gland ring so as to urge the co-molded sealing ring into the compressed state so that said first segment forms a seal between the inner surface of the connector body and an outer surface of a conduit positioned within the connector body, wherein the first segment of the co-molded sealing ring has a circumferential rim at said end of said first segment and a circumferential notch near said end of the first segment and wherein the second segment of the co-molded sealing ring has a circumferential rim at said end of said second segment and a circumferential notch near said end of the second segment, said first segment circumferential rim interfitting with the circumferential notch of the second segment and the second segment circumferential rim interfitting with the circumferential notch of the first segment.

2. The co-molded sealing ring according to claim 1, wherein the first segment of the co-molded sealing ring has a sloping surface dimensioned to contact a recess shoulder in a bore of the connector body.

3. The co-molded sealing ring according to claim 2, wherein the second segment of the co-molded sealing ring has a sloping surface extending away from a lower surface of the second segment, said sloping surface dimensioned to contact a portion of the inner surface of the connector body.

4. The co-molded sealing ring according to claim 1, wherein a lower surface of the first segment is smooth and the lower surface of the second segment is smooth.

5. The co-molded sealing ring according to claim 1, wherein the electrical fitting is a raintight compression connector.

6. The co-molded sealing ring according to claim 1, wherein the electrical fitting is a raintight compression coupler.

7. The co-molded sealing ring according to claim 1, wherein the co-molded sealing ring has an uncompressed cross-sectional profile as shown in FIG. 28.

8. A co-molded sealing ring for use in an electrical fitting, the co-molded sealing ring having a first region, a second region and a third region, the second region formed between the first and third regions, the first region having a first sloping surface dimensioned to contact a recess shoulder in a bore of a connector body of said electrical fitting and the third region having a sloping surface dimensioned to contact an inner surface of the connector body, wherein a first segment of the co-molded sealing ring, comprising the first region and a portion of the second region, is formed from a thermoplastic elastomer material so that a space formed between the first segment and the inner surface of the connector body adjacent said recess shoulder when the co-molded sealing ring is in an uncompressed state, is at least partially filled by the first segment when the sealing ring is in a compressed state, and wherein a second segment of the co-molded sealing ring, comprising a remainder of said second region and said third region, is formed from a medium-density polyethylene material, said second segment co-molded to the first segment, said second segment having an end surface positioned away from the first segment, said end surface dimensioned for contact by a gland ring so as to urge the co-molded sealing ring into the compressed state, and further wherein the first and second segments each have a lower surface dimensioned to contact an outer surface of a conduit positioned within said bore of the connector body;

whereby a raintight seal is established between the electrical fitting and the conduit when the sealing ring is in the compressed state.

9. The co-molded sealing ring according to claim 8, wherein the first segment of the co-molded sealing ring has a circumferential rim at an end thereof positioned away from the first sloping surface and a circumferential notch near said end positioned away from the first sloping surface and wherein the second segment of the co-molded sealing ring has a circumferential rim at an end thereof positioned away from said end surface and a circumferential notch near said end positioned away from the surface, said first segment circumferential rim interfitting with the circumferential notch of the second segment and the second segment circumferential rim interfitting with the circumferential notch of the first segment.

10. The co-molded sealing ring according to claim 9, wherein the lower surface of the first segment is smooth and the lower surface of the second segment is smooth.

11. The co-molded sealing ring according to claim 8, wherein the electrical fitting is a raintight compression connector.

12. The co-molded sealing ring according to claim 8, wherein the electrical fitting is a raintight compression coupler.

13. A raintight compression connector comprising:
a connector body having a first portion and a second portion and a bore extending through the first portion and the second portion, the first portion dimensioned for receipt of a conduit in said bore;
a gland nut having internal threads dimensioned for threaded engagement with first external threads formed in the first portion at the first end;
a gland ring dimensioned for contact with the gland nut so as to secure the gland nut and the first portion of the connector body to the conduit when the conduit is inserted into the first portion;
a co-molded sealing ring dimensioned for contact with the first portion of the connector body so as to make sealing contact with the conduit when the conduit is inserted into the first portion, said co-molded sealing ring having first, second and third regions, the second region formed between the first and third regions, the first region having a first sloping surface dimensioned to contact a recess shoulder in the bore of the first portion of the connector body and the third region having a third sloping surface dimensioned to contact an inner surface of the first portion of the connector body, wherein a first segment of the co-molded sealing ring, comprising the first region and a portion of the second region, is formed from a thermoplastic elastomer material so that a space formed between the first segment and the inner surface of the connector body adjacent said recess shoulder when the co-molded sealing ring is in an uncompressed state, is at least partially filled by the first segment when the co-molded sealing ring is in a compressed state, and wherein a second segment of the co-molded sealing ring, comprising a remainder of said second region and said third region, is formed from a medium-density polyethylene material, said second segment having an end surface positioned away from the first segment, said end surface dimensioned for contact by athe gland ring so as to urge the co-molded sealing ring into the compressed state, and further wherein the first and second segments each have a lower surface dimensioned to contact an outer surface of a conduit positioned within said bore of the connector body; whereby a raintight seal is established between the electrical fitting and the conduit when the sealing ring is in the compressed state;
wherein the connector body has an outer flange and wherein the second portion of the connector body is dimensioned for receipt of a knockout gasket, the second portion having second external threads dimensioned for receipt of a locknut for securing the knockout gasket positioned around a knockout hole in an electrical enclosure between said outer flange and the electrical enclosure, thereby forming a raintight seal therewith.

14. The raintight compression connector according to claim 13, wherein the slope of said third sloping surface is approximately ten degrees relative to the lower surface of the co-molded sealing ring.

15. The raintight compression connector according to claim 14, wherein the slope of said first sloping surface is approximately thirty degrees relative to the lower surface of the co-molded sealing ring.

16. The raintight compression connector according to claim 15, wherein the second region has a second sloping surface and wherein the slope of the second sloping surface is approximately two degrees relative to the lower surface of the co-molded sealing ring.

17. The raintight compression connector according to claim 13, wherein the co-molded sealing ring has an overall length and the third region of said co-molded sealing ring is approximately twenty-three percent of said overall length.

18. The raintight compression connector according to claim 17, wherein the first region of said co-molded sealing ring is approximately six and one-half percent of said overall length of the co-molded sealing ring.

19. The raintight compression connector according to claim 13, wherein the co-molded sealing ring has an uncompressed cross-sectional profile as shown in FIG. 28.

20. A raintight compression coupler comprising:
a connector body having a first portion and a second portion and a bore extending through the first portion and the second portion, the first portion dimensioned for receipt of a conduit in said bore, the first portion having a first end and a second end and the second portion dimensioned for receipt of a conduit in said bore, the second portion having a first end and a second end;
a first gland nut having internal threads dimensioned for threaded engagement with first external threads formed in the first portion at its first end;
a first gland ring dimensioned for contact with the first gland nut so as to secure the first gland nut and the first portion of the connector body to the first conduit when the first conduit is inserted into the first portion;
a first co-molded sealing ring dimensioned for contact with the first portion of the connector body so as to make sealing contact with the first conduit when the first conduit is inserted into the first portion, said first co-molded sealing ring having a first, second and third region, the second region formed between the first and third regions, the first region having a sloping surface dimensioned to contact a recess shoulder in the bore of the first portion of the connector body and the third region having a sloping surface dimensioned to contact an inner surface of the first portion of the connector body, wherein a first segment of the co-molded sealing ring, comprising the first region and a portion of the second region, is formed from a thermoplastic elastomer material so that a space formed between the first segment and the inner surface of the connector body adjacent said recess shoulder when the co-molded sealing ring is in an uncompressed state, is substantially filled by the first segment when the co-molded sealing ring is in a compressed state, and wherein a second segment of the co-molded sealing ring, comprising a remainder of said second region and said third region, is formed from a medium-density polyethylene material, said second segment having an end surface positioned away from the first segment, said end surface dimensioned for contact by the first gland ring so as to urge the co-molded sealing ring into the compressed state, and further wherein the first and second segments each have a lower surface dimensioned to contact an outer surface of a conduit positioned within said bore of the connector body, whereby a raintight seal is established between the electrical fitting and the conduit when the sealing ring is in the compressed state; and a second gland nut having internal threads dimensioned for threaded engagement with second external threads formed in the second portion at its first end;

a second gland ring dimensioned for contact with the second gland nut so as to secure the second gland nut and the second portion of the connector body to the second conduit when the second conduit is inserted into the second portion; and a second co-molded sealing ring dimensioned for contact with the second portion of the connector body so as to make sealing contact with the second conduit when the second conduit is inserted into the second portion, said second co-molded sealing ring having a first, second and third region, the second region formed between the first and third regions, the first region having a sloping surface dimensioned to contact a recess shoulder in the bore of the first portion of the connector body and the third region having a sloping surface dimensioned to contact an inner surface of the second portion of the connector body wherein a first segment of the co-molded sealing ring, comprising the first region and a portion of the second region, is formed from a thermoplastic elastomer material so that a space formed between the first segment and the inner surface of the connector body adjacent said recess shoulder when the co-molded sealing ring is in an uncompressed state, is at least partially filled by the first segment when the co-molded sealing ring is in a compressed state, and wherein a second segment of the co-molded sealing ring, comprising a remainder of said second region and said third region, is formed from a medium-density polyethylene material, said second segment having an end surface positioned away from the first segment, said end surface dimensioned for contact by the second gland ring so as to urge the co-molded sealing ring into the compressed state, and further wherein the first and second segments each have a lower surface dimensioned to contact an outer surface of a conduit positioned within said bore of the connector body, whereby a raintight seal is established between the electrical fitting and the conduit when the sealing ring is in the compressed state.

21. The raintight compression coupler according to claim 20, wherein the slopes of said third sloping surface of the first co-molded sealing ring and the third sloping surface of the second co-molded sealing ring are approximately ten degrees relative to the lower surface of the first co-molded sealing ring and the lower surface of the second co-molded sealing ring respectively.

22. The raintight compression coupler according to claim 21, wherein the slopes of the first sloping surface of the first co-molded sealing ring and the first sloping surface of the co-molded second sealing ring are approximately thirty degrees relative to the lower surface of the first co-molded sealing ring and a lower surface of the second co-molded sealing ring respectively.

23. The raintight compression coupler according to claim 22, wherein the second region of the first co-molded sealing ring and the second region of the second co-molded sealing ring each has a second sloping surface and wherein the slopes of the second sloping surface of the first co-molded sealing ring and the second sloping surface of the second co-molded sealing ring are approximately two degrees relative to the lower surface of the first co-molded sealing ring and the lower surface of the second co-molded sealing ring respectively.

24. The raintight compression coupler according to claim 20, wherein the first co-molded sealing ring and the second co-molded sealing ring each has an overall length and the third region of said first and second co-molded sealing rings are each approximately twenty-three percent of said overall length.

25. The raintight compression coupler according to claim 24, wherein the first region of said first co-molded sealing ring and said second co-molded sealing ring are each approximately six and one-half percent of said respective overall length of the first and second co-molded sealing rings.

26. The raintight compression coupler according to claim 20, wherein the first co-molded sealing ring and the second co-molded sealing ring each has an uncompressed cross-sectional profile as shown in FIG. 28.

* * * * *